US012725143B2

(12) United States Patent
Yoshizawa et al.

(10) Patent No.: US 12,725,143 B2
(45) Date of Patent: Sep. 1, 2026

(54) SETTLEMENT SYSTEM, SERVER DEVICE, MANAGEMENT METHOD, AND NON-TRANSITORY COMPUTER-READABLE STORAGE MEDIUM STORING PROGRAM

(71) Applicant: SEIKO EPSON CORPORATION, Tokyo (JP)

(72) Inventors: Junichi Yoshizawa, Matsumoto (JP); Jun Umetsu, Shiojiri (JP); Kiyoshi Ogawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 18/341,282

(22) Filed: Jun. 26, 2023

(65) Prior Publication Data

US 2023/0419290 A1 Dec. 28, 2023

(30) Foreign Application Priority Data

Jun. 28, 2022 (JP) ................................. 2022-103680

(51) Int. Cl.
*G06Q 20/20* (2012.01)
*G06Q 20/38* (2012.01)

(52) U.S. Cl.
CPC ......... *G06Q 20/209* (2013.01); *G06Q 20/389* (2013.01)

(58) Field of Classification Search
CPC ........................... G06Q 20/209; G06Q 20/389
See application file for complete search history.

(56) References Cited

U.S. PATENT DOCUMENTS 10,115,083 B1 * 10/2018 Koeppel ................ G06Q 10/10
10,510,047 B1 * 12/2019 Benkreira ............. H04L 51/212

FOREIGN PATENT DOCUMENTS

JP 2015194861 11/2015
JP 2021163171 10/2021
JP 2022-058207 A 4/2022
JP 2022-058451 A 4/2022

* cited by examiner

*Primary Examiner* — Florian M Zeender
*Assistant Examiner* — Joseph M Mutschler
(74) *Attorney, Agent, or Firm* — WORKMAN NYDEGGER

(57) ABSTRACT

A server device includes an acquisitor that acquires first information based on print information for printing, by a printing apparatus, a first image representing transaction details related to a settlement and acquires second information related to a request for approval of the settlement from a terminal device that requests approval of the settlement, and when first feature information included in the first information and second feature information included in the second information correspond to each other, a management unit that manages first settlement information included in the first information and second settlement information included in the second information in association with each other.

8 Claims, 15 Drawing Sheets

FIG. 8

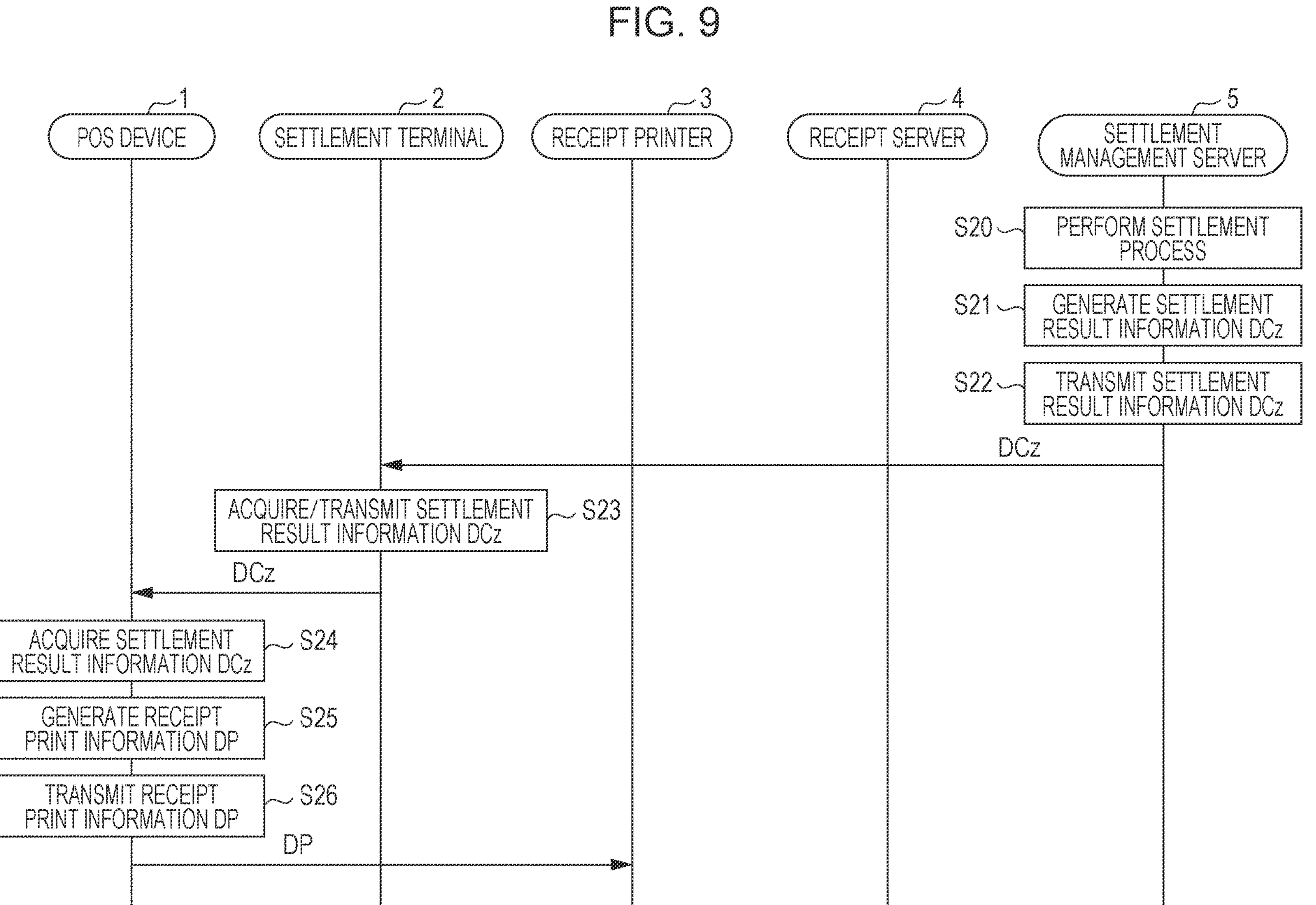
FIG. 9
1
POS DEVICE
2
SETTLEMENT TERMINAL
3
RECEIPT PRINTER
4
RECEIPT SERVER
5
SETTLEMENT MANAGEMENT SERVER
S20
PERFORM SETTLEMENT PROCESS
S21
GENERATE SETTLEMENT RESULT INFORMATION DCz
S22
TRANSMIT SETTLEMENT RESULT INFORMATION DCz
DCz
ACQUIRE/TRANSMIT SETTLEMENT RESULT INFORMATION DCz
S23
DCz
ACQUIRE SETTLEMENT RESULT INFORMATION DCz
S24
GENERATE RECEIPT PRINT INFORMATION DP
S25
TRANSMIT RECEIPT PRINT INFORMATION DP
S26
DP

FIG. 10

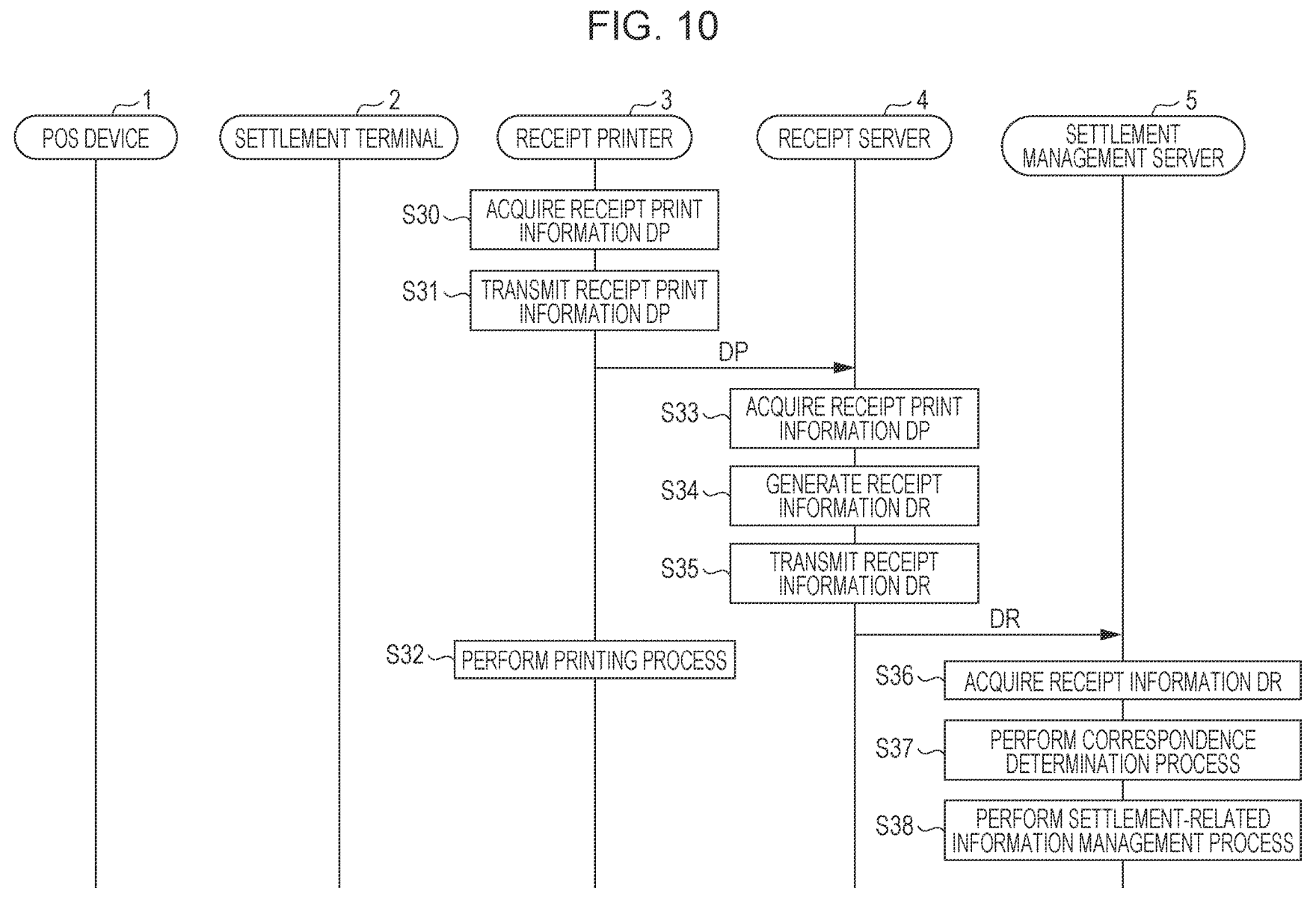

POS DEVICE 1

SETTLEMENT TERMINAL 2

RECEIPT PRINTER 3

RECEIPT SERVER 4

SETTLEMENT MANAGEMENT SERVER 5

S30 ACQUIRE RECEIPT PRINT INFORMATION DP

S31 TRANSMIT RECEIPT PRINT INFORMATION DP

DP

S33 ACQUIRE RECEIPT PRINT INFORMATION DP

S34 GENERATE RECEIPT INFORMATION DR

S35 TRANSMIT RECEIPT INFORMATION DR

S32 PERFORM PRINTING PROCESS

DR

S36 ACQUIRE RECEIPT INFORMATION DR

S37 PERFORM CORRESPONDENCE DETERMINATION PROCESS

S38 PERFORM SETTLEMENT-RELATED INFORMATION MANAGEMENT PROCESS

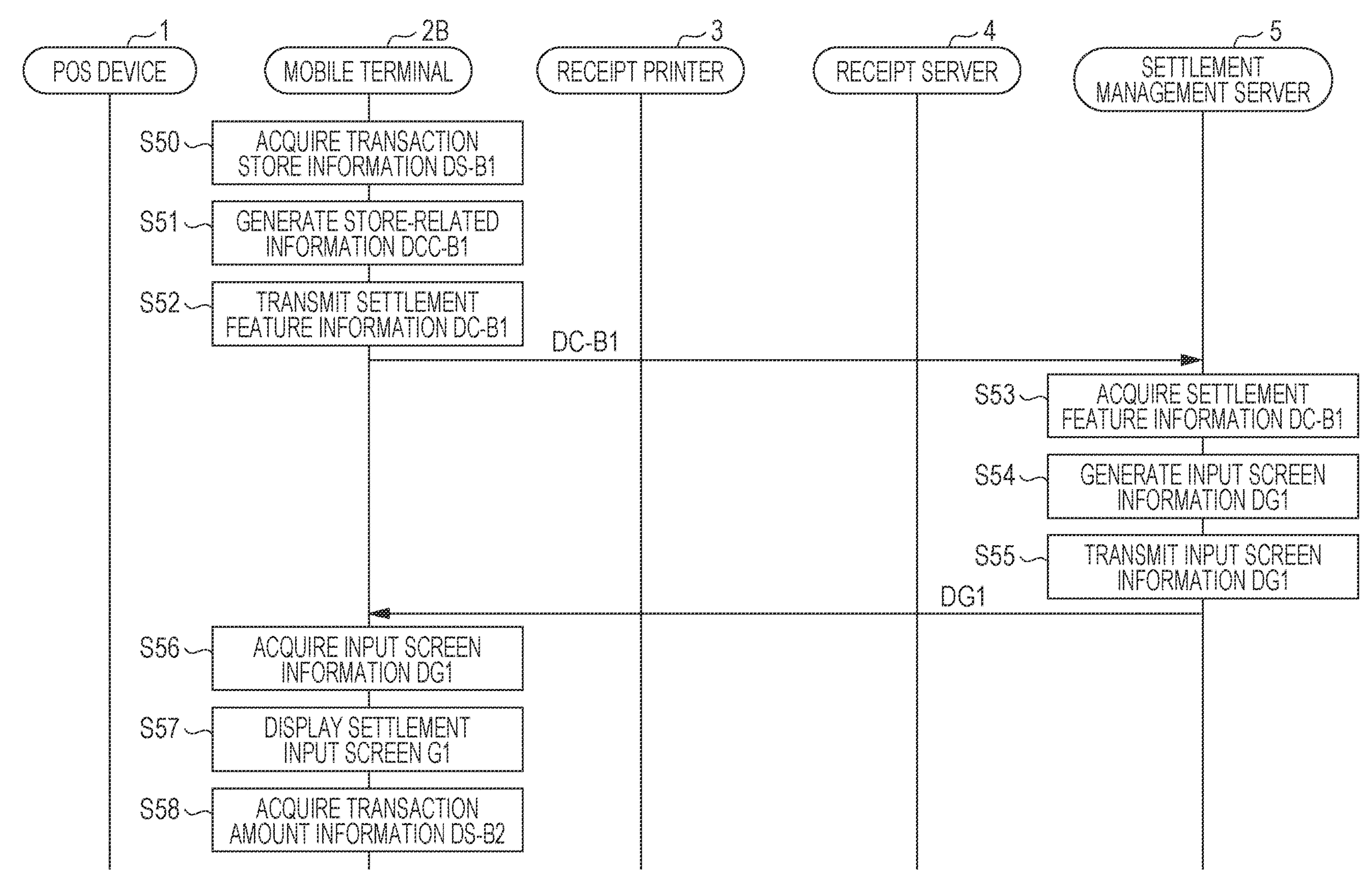
FIG. 14
1
POS DEVICE
2B
MOBILE TERMINAL
3
RECEIPT PRINTER
4
RECEIPT SERVER
5
SETTLEMENT MANAGEMENT SERVER
S50
ACQUIRE TRANSACTION STORE INFORMATION DS-B1
S51
GENERATE STORE-RELATED INFORMATION DCC-B1
S52
TRANSMIT SETTLEMENT FEATURE INFORMATION DC-B1
DC-B1
S53
ACQUIRE SETTLEMENT FEATURE INFORMATION DC-B1
S54
GENERATE INPUT SCREEN INFORMATION DG1
S55
TRANSMIT INPUT SCREEN INFORMATION DG1
DG1
S56
ACQUIRE INPUT SCREEN INFORMATION DG1
S57
DISPLAY SETTLEMENT INPUT SCREEN G1
S58
ACQUIRE TRANSACTION AMOUNT INFORMATION DS-B2

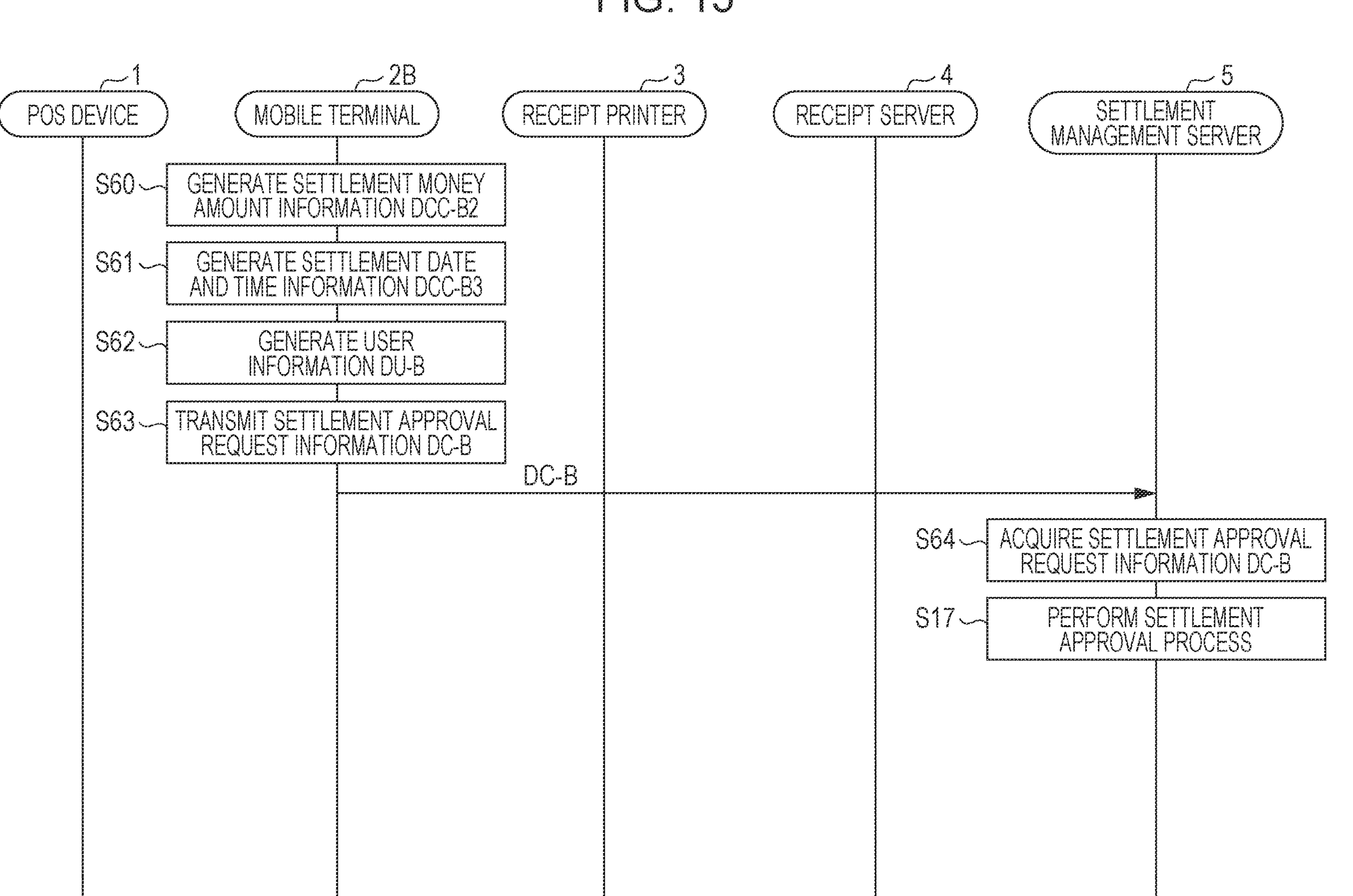
FIG. 15
1
POS DEVICE
2B
MOBILE TERMINAL
3
RECEIPT PRINTER
4
RECEIPT SERVER
5
SETTLEMENT MANAGEMENT SERVER
S60
GENERATE SETTLEMENT MONEY AMOUNT INFORMATION DCC-B2
S61
GENERATE SETTLEMENT DATE AND TIME INFORMATION DCC-B3
S62
GENERATE USER INFORMATION DU-B
S63
TRANSMIT SETTLEMENT APPROVAL REQUEST INFORMATION DC-B
DC-B
S64
ACQUIRE SETTLEMENT APPROVAL REQUEST INFORMATION DC-B
S17
PERFORM SETTLEMENT APPROVAL PROCESS

SETTLEMENT SYSTEM, SERVER DEVICE, MANAGEMENT METHOD, AND NON-TRANSITORY COMPUTER-READABLE STORAGE MEDIUM STORING PROGRAM

The present application is based on, and claims priority from JP Application Serial Number 2022-103680, filed Jun. 28, 2022, the disclosure of which is hereby incorporated by reference herein in its entirety.

BACKGROUND

1. Technical Field

The present disclosure relates to a settlement system, a server device, a management method, and a non-transitory computer-readable storage medium storing a program.

2. Related Art

In recent years, techniques related to a settlement have become widespread. For example, JP-A-2022-058451 discloses a technique related to a settlement using a credit card.

As in the related technology, in the settlement using a credit card, the server device determines whether to accept the settlement based on the information supplied from the settlement terminal that requests that the server device approve the settlement based on the information acquired from the credit card. In this case, the information acquired by the server device is limited to the information supplied from the settlement terminal. From the viewpoint of security and the like, information supplied from the settlement terminal to the server device is generally limited to information necessary for the server device to determine whether to accept the settlement. Therefore, when the information acquired by the server device is limited to the information supplied from the settlement terminal, there is a problem that, for example, information related to the settlement, such as information for analyzing settlement trends using information managed by the server device, cannot be utilized for a purpose other than the settlement. It should be noted that there is a possibility that the same problem will occur in a settlement using various means of settlement other than credit cards.

SUMMARY

According to an aspect of the present disclosure, in a non-transitory computer-readable storage medium storing a program, the program causes a processor to function as an acquisitor that acquires first information based on print information for printing, by a printing apparatus, a first image representing transaction details related to a settlement and acquires second information related to a request for approval of the settlement from a terminal device that requests approval of the settlement, and when first feature information included in the first information and second feature information included in the second information correspond to each other, a management unit that manages first settlement information included in the first information and second settlement information included in the second information in association with each other.

According to another aspect of the present disclosure, in non-transitory computer-readable storage medium storing a program, the program causes a processor to function as a print information acquisitor that acquires print information for printing a first image representing transaction details related to a settlement, an information generator that generates first information about transaction details related to the settlement based on the print information acquired by the print information acquisitor, and an information supplier that supplies, to a server device that acquires second information related to a request for approval of the settlement, the first information generated by the information generator, the server device managing first settlement information included in the first information and second settlement information included in the second information in association with each other when first feature information included in the first information and second feature information included in the second information correspond to each other.

According to still another aspect of the present disclosure, in a non-transitory computer-readable storage medium storing a program, the program causes a processor to function as a print information acquisitor that acquires print information for printing a first image representing transaction details related to a settlement, and a print information supplier that supplies the print information to a management system that acquires first information based on the print information and acquires second information related to a request for approval of the settlement, where the management system manages a first settlement information included in the first information and second settlement information included in the second information in association with each other when a first feature information included in the first information and a second feature information included in second information correspond to each other.

According to still another aspect of the present disclosure, a server device includes an acquisitor that acquires first information based on print information for printing, by a printing apparatus, a first image representing transaction details related to a settlement and acquires second information related to a request for approval of the settlement from a terminal device that requests approval of the settlement, and when first feature information included in the first information and second feature information included in the second information correspond to each other, a management unit that manages first settlement information included in the first information and second settlement information included in the second information in association with each other.

According to still another aspect of the present disclosure, a management method includes acquiring first information based on print information for printing, by a printing apparatus, a first image representing transaction details related to a settlement, acquiring second information related to a request for approval of the settlement from a terminal device that requests approval of the settlement, and when first feature information included in the first information and second feature information included in the second information correspond to each other, managing first settlement information included in the first information and second settlement information included in the second information in association with each other.

According to still another aspect of the present disclosure, a settlement system includes an acquisitor that acquires first information based on print information for printing, by a printing apparatus, a first image representing transaction details related to a settlement and acquires second information related to a request for approval of the settlement from a terminal device that requests approval of the settlement, and when first feature information included in the first information and second feature information included in the second information correspond to each other, a management unit that manages first settlement information included in the first information and second settlement information included in the second information in association with each other.

BRIEF DESCRIPTION OF THE DRAWINGS

FIG. 8 is a sequence chart showing an example of a transaction management process.

FIG. 9 is a sequence chart showing an example of a transaction management process.

FIG. 10 is a sequence chart showing an example of a transaction management process.

FIG. 14 is a sequence chart showing an example of a transaction management process according to the first modification.

FIG. 15 is a sequence chart showing an example of a transaction management process according to the first modification.

DESCRIPTION OF EXEMPLARY EMBODIMENTS

Hereinafter, embodiments for implementing the present disclosure will be described with reference to the drawings. However, in each figure, the size and scale of each part are appropriately changed from the actual ones. In addition, since the embodiments described below are preferable specific examples of the present disclosure, there are various technically preferred limitations. However, the scope of the present disclosure is not limited to these embodiments unless otherwise specified in the following description.

A. EMBODIMENT

An example of a settlement system Sys according to the present embodiment will be described.

1. Overview of Settlement System

The outline of the settlement system Sys according to the present embodiment will be described below with reference to FIGS. 1 and 2.

Figure 1:
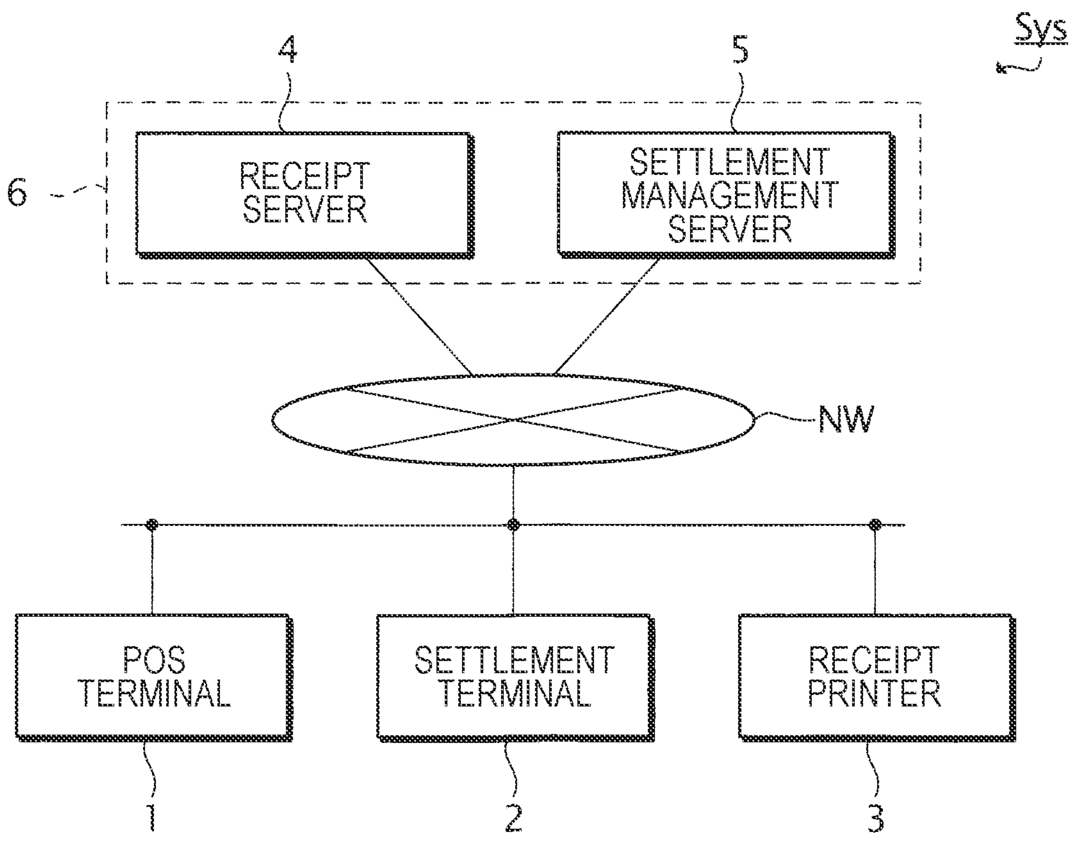
FIG. 1 is a block diagram showing an example configuration of a settlement system Sys according to an embodiment of the present disclosure.
Figure 2:
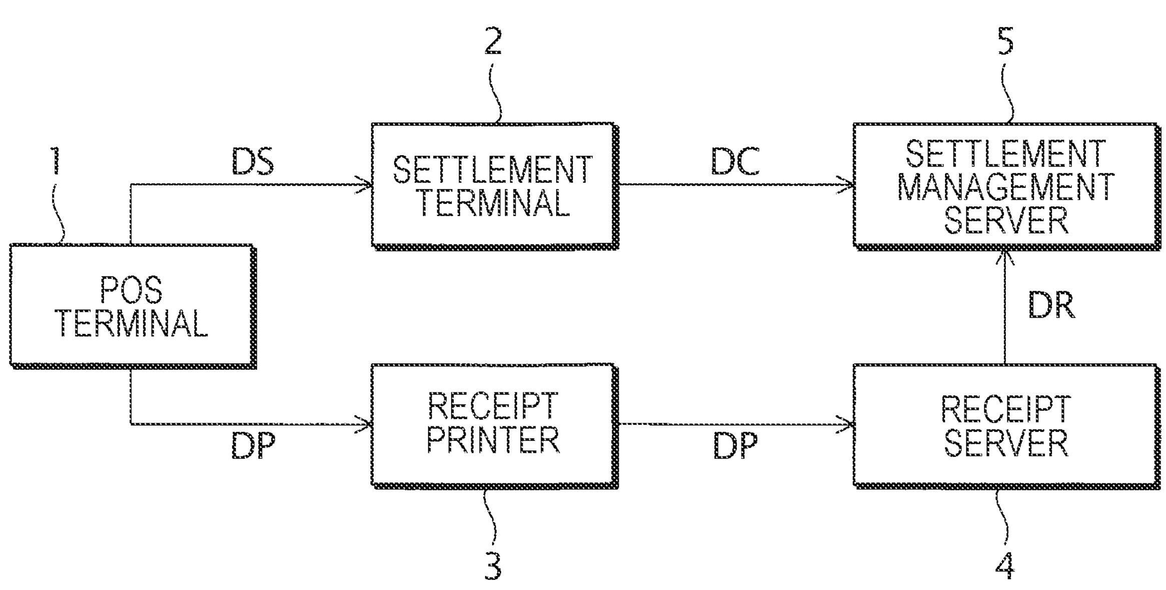
FIG. 2 is an explanatory diagram showing an example of information flow in the settlement system Sys.

FIG. 1 is a block diagram showing an example of the configuration of the settlement system Sys according to the present embodiment. FIG. 2 is a diagram showing an example of information transmitted and received inside the settlement system Sys.

In the present embodiment, a case where, when purchasing a product at a facility such as a store, a customer U makes a settlement for the product will be described as an example, but the present disclosure is not limited to such an aspect. The present disclosure may be applied to a case in which, when receiving a service at a facility such as a service providing facility, the customer U makes a settlement as consideration for the provision of the service.

As illustrated in FIG. 1, the settlement system Sys includes a POS terminal 1, a settlement terminal 2, a receipt printer 3, a receipt server 4, and a settlement management server 5. In the present embodiment, the settlement terminal 2 is an example of a "terminal device", the receipt printer 3 is an example of a "printing apparatus", and the settlement management server 5 is an example of a "server device". Also, in the present embodiment, the receipt server 4 and the settlement management server 5 may be referred to as a "management system 6".

The POS terminal 1 acquires information about the product purchased by the customer U and information about the unit price of the product purchased by the customer U via a barcode reader or the like, and calculates the total amount to be paid by the customer U. The POS is an abbreviation for Point Of Sales. Information acquired by the POS terminal 1 via a barcode reader or the like and information indicating the total amount calculated based on the information are hereinafter referred to as purchased product information. Also, the POS terminal 1 acquires information about the means of settlement designated by the customer U for payment when purchasing the product. Information about the means of settlement acquired by the POS terminal 1 is hereinafter referred to as designated means of settlement information. Then, the POS terminal 1 generates payment information DS, which is information related to payment by the customer U, based on the purchased product information and the designated means of settlement information.

In the present embodiment, as an example, it is assumed that the payment information DS includes transaction feature information DSS, transaction detail information DSM, and means of settlement information DSK.

The transaction feature information DSS is information including transaction store information DSS1, transaction money amount information DSS2, and transaction date and time information DSS3. The transaction store information DSS1 is information indicating a store where the customer U purchases the product. The transaction money amount information DSS2 is information indicating the total amount paid by the customer U when purchasing the product. The transaction date and time information DSS3 is information indicating the date and time when the customer U purchased the product.

The transaction detail information DSM includes Q pieces of product identification information DSM1[1] to DSM1[Q], Q pieces of product unit price information DSM2[1] to DSM2[Q], and Q pieces of product quantity information DSM3[1] to DSM3[Q]. The value Q is a natural number that satisfies "Q≥1" and indicates the number of product types purchased by the customer U. For example, when the customer U purchases one or a plurality of products of one type, the value Q is "1", and when the customer U purchases one or a plurality of products of two types, the value Q is "2". The product identification information DSM1[*q*] is information for identifying the q-th product, such as the name of the q-th product among the products purchased by the customer U. The value q is a natural number that satisfies "1≤q≤Q". The product unit price information DSM2[*q*] is information indicating the unit price of the q-th product purchased by the customer U. The product quantity information DSM3[*q*] is information indicating the purchase quantity of the q-th product by the customer U.

The means of settlement information DSK is information including R pieces of means of settlement identification information DSK1[1] to DSK1[R] and R pieces of means of settlement money amount information DSK2[1] to DSK2[R]. The value R is a natural number that satisfies "R≥1" and indicates the number of means of settlement used by the customer U when purchasing the product. For example, when the customer U purchases the product using only a credit card, the value R is "1", and when the customer U purchases the product using only cash, the value R is "1". However, when the customer U purchases the products using a credit card and cash, the value R is "2". The means of settlement identification information DSK1[*r*] is information for identifying the r-th means of settlement, such as the name of the r-th means of settlement, among R means of settlement used by the customer U to purchase the product. The value r is a natural number that satisfies "1≤r≤R". The means of settlement money amount information DSK2[*r*] is information indicating the amount paid by the r-th means of settlement among the R means of settlement used by the customer U to purchase the product.

As illustrated in FIG. 1, the POS terminal 1 can communicate with the settlement terminal 2 via a wired network, a wireless network, or the like. As illustrated in FIG. 2, the POS terminal 1 transmits the payment information DS generated by the POS terminal 1 to the settlement terminal 2.

The POS terminal 1 generates receipt print information DP, which is information for printing a receipt R related to payment by the customer U, based on the purchased product information and the designated means of settlement information.

As illustrated in FIG. 1, the POS terminal 1 can communicate with the receipt printer 3 via a wired network, a wireless network, or the like. As illustrated in FIG. 2, the POS terminal 1 transmits the receipt print information DP generated by the POS terminal 1 to the receipt printer 3.

The settlement terminal 2 uses a card reader or the like to acquire information about the credit card from the credit card owned by the customer U. Information related to the credit card owned by the customer U that is acquired by the settlement terminal 2 is hereinafter referred to as user information DU.

In the present embodiment, as an example, it is assumed that the user information DU includes user identification information DU1 and user-related information DU2. The user identification information DU1 is information related to the credit card number of the credit card owned by the customer U. The user-related information DU2 is information indicating the expiration date of the credit card owned by the customer U.

The settlement terminal 2 generates settlement approval request information DC that is information requesting approval of the settlement for the purchase of the product by the customer U based on the payment information DS supplied from the POS terminal 1 and the user information DU acquired by the settlement terminal 2. In the present embodiment, as an example, it is assumed that the settlement approval request information DC includes settlement feature information DCC and the user information DU.

Further, in the present embodiment, as an example, it is assumed that the settlement feature information DCC includes store-related information DCC1, settlement money amount information DCC2, and settlement date and time information DCC3. The store-related information DCC1 is information indicating a store where the customer U purchases the product. However, the store-related information DCC1 may be information related to the store where the customer U purchases the product. The information related to the store may be information indicating the chain store to which the store where the customer U purchases the product belongs, or information indicating the corporation that operates the store where the customer U purchases the product. In the present embodiment, each of the store where the customer U purchases the product, the chain store to which the store where the customer U purchases the product belongs, and the corporation that operates the store where the customer U purchases the product is an example of "a provider that provides a product or a service related to the settlement". The settlement money amount information DCC2 is information indicating the total amount paid by the credit card when the customer U purchases the product. The settlement date and time information DCC3 is information indicating the date and time when the settlement approval request information DCC is generated. In the present embodiment, the date and time when the settlement approval request information DC is generated is an example of a "date and time related to a request for approval of the settlement".

As illustrated in FIG. 1, the settlement terminal 2 can communicate with the settlement management server 5 via a wired network or a wireless network such as the Internet NW. As illustrated in FIG. 2, the settlement terminal 2 transmits the settlement approval request information DC generated by the settlement terminal 2 to the settlement management server 5.

The receipt printer 3 prints the receipt R based on the receipt print information DP supplied from the POS terminal 1. Note that the receipt print information DP may be information indicating an image representing the receipt R.

As illustrated in FIG. 1, the receipt printer 3 can communicate with the receipt server 4 via a wired network or a wireless network such as the Internet NW. As illustrated in FIG. 2, the receipt printer 3 transmits the receipt print information DP supplied from the POS terminal 1 to the receipt server 4.

The receipt server 4 generates receipt information DR based on the receipt print information DP supplied from the receipt printer 3.

In the present embodiment, as an example, it is assumed that the receipt information DR includes transaction feature information DRR, transaction detail information DRM, and means of settlement information DRK.

The transaction feature information DRR is information including transaction store information DRR1, transaction money amount information DRR2, and transaction date and time information DRR3. The transaction store information DRR1 is information indicating a store displayed on the receipt R as the store where the customer U purchased the product. In the present embodiment, the store displayed on the receipt R as the store where the customer U purchased the product is an example of a "settlement facility". The transaction money amount information DRR2 is information indicating the money amount displayed on the receipt R as the total amount paid by the customer U when purchasing the product. The transaction date and time information DRR3 is information indicating the date and time displayed on the receipt R as the date and time when the customer U purchased the product. In the present embodiment, the date and time displayed on the receipt R as the date and time when the customer U purchased the product is an example of a "date and time related to the generation of the receipt print information DP".

The transaction detail information DRM includes Q pieces of product identification information DRM1[1] to DRM1[Q], Q pieces of product unit price information DRM2[1] to DRM2[Q], and Q pieces of product quantity information DRM3[1] to DRM3[Q]. The product identification information DRM1[*q*] is information indicating the product displayed on the receipt R as a character string for identifying the q-th product, such as the name of the q-th product among the products purchased by the customer U. The product unit price information DRM2[*q*] is information indicating the unit price displayed on the receipt R as the unit price of the q-th product purchased by the customer U. The product quantity information DRM3[*q*] is information indicating the quantity displayed on the receipt R as the quantity of the q-th product purchased by the customer U.

The means of settlement information DRK is information including R pieces of means of settlement identification information DRK1[1] to DRK1[R] and R pieces of means of settlement money amount information DRK2[1] to DRK2[R]. The means of settlement identification information DRK1[*r*] is information indicating the means of settlement displayed on the receipt R as a character string for identifying the r-th means of settlement, such as the name of the r-th means of settlement, among the R means of settlement used by the customer U to purchase the product. The means of settlement money amount information DRK2[*r*] is information indicating the money amount displayed on the receipt R as the amount paid by the r-th means of settlement among the R means of settlement used by the customer U to purchase the product.

As illustrated in FIG. 1, the receipt server 4 can communicate with the settlement management server 5 via a wired network or a wireless network such as the Internet NW. As illustrated in FIG. 2, the receipt server 4 transmits the receipt information DR generated by the receipt server 4 to the settlement management server 5.

The settlement management server 5 performs a settlement approval process based on the settlement approval request information DC supplied from the settlement terminal 2. The settlement approval process is a process of approving the settlement by the customer U.

Further, when the settlement management server 5 approves the settlement by the customer U in the settlement approval process, the settlement management server 5 performs the correspondence determination process based on the settlement approval request information DC supplied from the settlement terminal 2 and the receipt information DR supplied from the receipt server 4. The correspondence determination process is a process of determining whether the settlement feature information DCC included in the settlement approval request information DC and the transaction feature information DRR included in the receipt information DR correspond to each other.

Further, when the settlement management server 5 determines in the correspondence determination process that the settlement feature information DCC included in the settlement approval request information DC and the transaction feature information DRR included in the receipt information DR correspond to each other, the settlement management server 5 performs the settlement-related information management process. The settlement-related information management process is a process of managing the user information DU included in the settlement approval request information DC and the transaction detail information DRM included in the receipt information DR in association with each other.

2. Overview of Various Servers and Terminals

An example of the configuration of various servers and terminals included in the settlement system Sys will be described below with reference to FIGS. 3 to 7.

Figure 3:
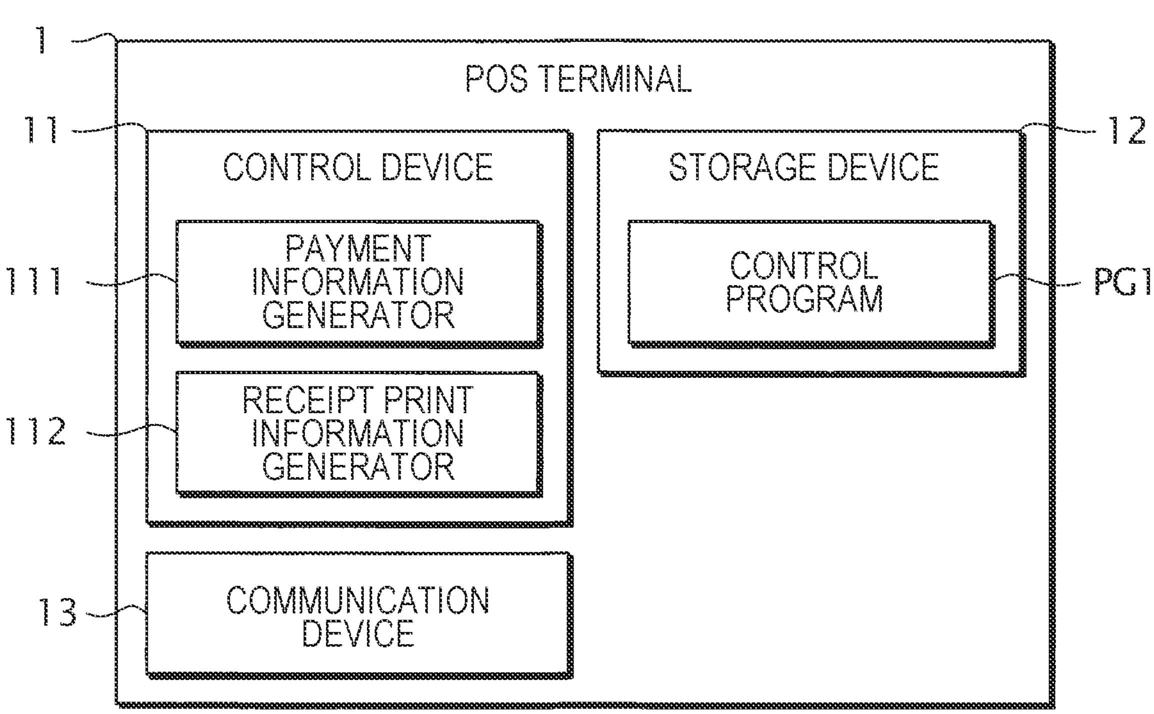
FIG. 3 is a block diagram showing an example of the configuration of a POS terminal.

FIG. 3 is a block diagram showing an example of an overview of the configuration of the POS terminal 1.

As illustrated in FIG. 3, the POS terminal 1 includes a control device 11 for controlling each component of the POS terminal 1, a storage device 12 for storing various pieces of information, and a communication device 13 for communicating with an external device existing outside the POS terminal 1.

The storage device 12 includes, for example, a volatile memory such as a RAM that functions as a work area for the control device 11, and a nonvolatile memory such as an EEPROM that stores various pieces of information such as a control program PG1 of the POS terminal 1. The RAM is an abbreviation for a random access memory. The EEPROM is an abbreviation for an electrically erasable programmable read-only memory.

The control device 11 includes, for example, a processor. The processor provided in the control device 11 includes, for example, one or more CPUs. The processor provided in the control device 11 executes the control program PG1 stored in the storage device 12 and operates according to the control program PG1, thereby controlling each component of the POS terminal 1. Note that the processor provided in the control device 11 may include hardware such as a GPU, a DSP, or an FPGA in addition to one or more CPUs, or in place of part or all of one or more CPUs. The CPU is an abbreviation for a central processing unit. The GPU is an abbreviation for a graphics processing unit. The DSP is an abbreviation for a digital signal processor. The FPGA is an abbreviation for a field programmable gate array.

More specifically, the control device 11 can execute the control program PG1 and operating according to the control program PG1, thereby functioning as a payment information generator 111 and a receipt print information generator 112.

The payment information generator 111 generates the payment information DS based on the purchased product information and the designated means of settlement information. The receipt print information generator 112 generates the receipt print information DP based on the purchased product information and the designated means of settlement information.

The communication device 13 is hardware for communicating with the settlement terminal 2 and the receipt printer 3 via, for example, a wired network or a wireless network.

Figure 4:
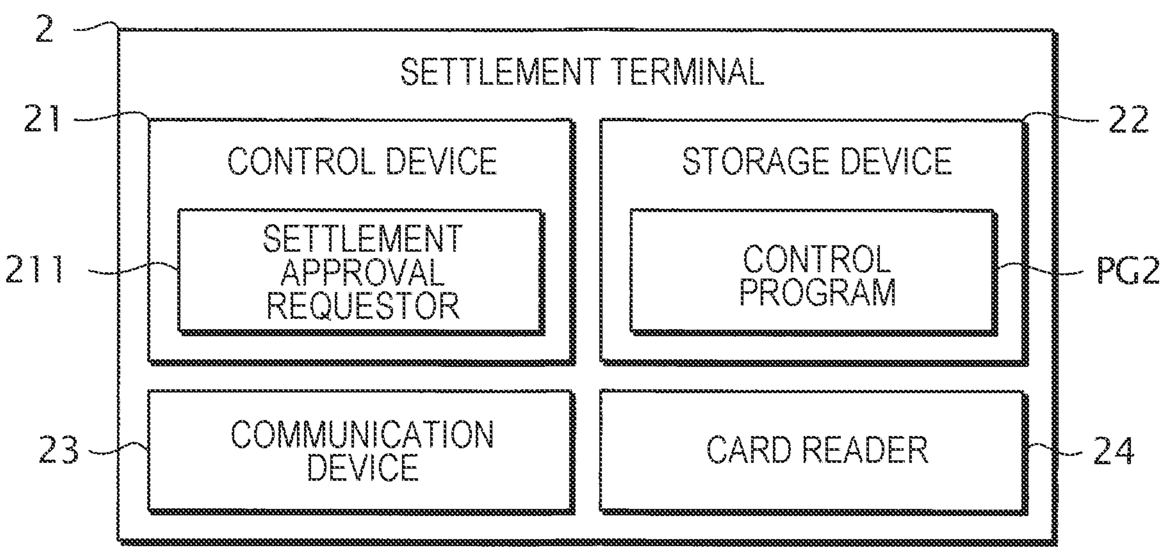
FIG. 4 is a block diagram showing an example of the configuration of a settlement terminal.

FIG. 4 is a block diagram showing an example of an overview of the configuration of the settlement terminal 2.

As illustrated in FIG. 4, the settlement terminal 2 includes a control device 21 for controlling each component of the settlement terminal 2, a storage device 22 for storing various pieces of information, a communication device 23 for communicating with an external device existing outside the settlement terminal 2, and a card reader 24 for acquiring information from the customer U's credit card.

The storage device 22 includes, for example, a volatile memory such as a RAM that functions as a work area for the control device 21, and a nonvolatile memory such as an EEPROM that stores various pieces of information such as a control program PG2 of the settlement terminal 2.

The control device 21 includes, for example, a processor. The processor provided in the control device 21 includes, for example, one or more CPUs. The processor provided in the control device 21 executes the control program PG2 stored in the storage device 22 and operates according to the control program PG2, thereby controlling each component of the settlement terminal 2. Note that the processor provided in the control device 21 may include hardware such as a GPU, a DSP, or an FPGA in addition to one or more CPUs, or in place of part or all of one or more CPUs.

More specifically, the control device 21 can execute the control program PG2 and operating according to the control program PG2, thereby functioning as a settlement approval requestor 211. The settlement approval requestor 211 generates the settlement approval request information DC based on the payment information DS supplied from the POS terminal 1 and the user information DU acquired by the card reader 24.

The communication device 23 is hardware for communicating with the POS terminal 1 and the settlement management server 5 via, for example, a wired network or a wireless network. The card reader 24 is, for example, a card reader for reading information from the customer U's credit card.

Figure 5:
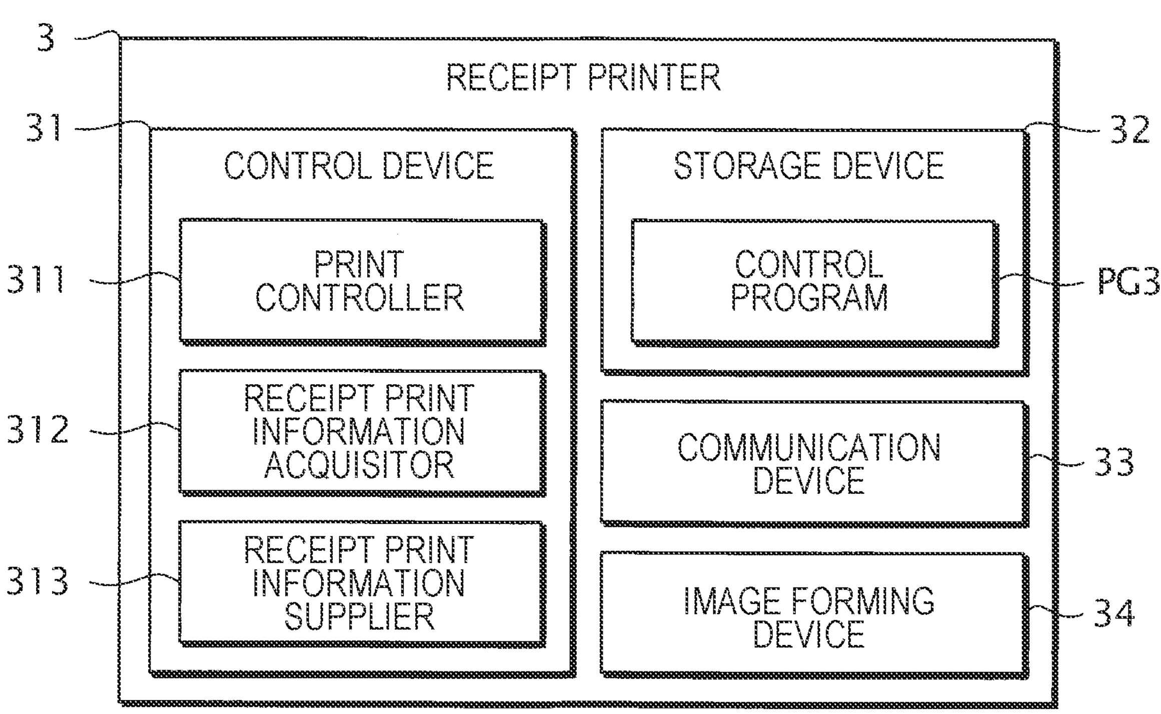
FIG. 5 is a block diagram showing an example of the configuration of a receipt printer.

FIG. 5 is a block diagram showing an example of an overview of the configuration of the receipt printer 3.

As illustrated in FIG. 5, the receipt printer 3 includes a control device 31 for controlling each component of the receipt printer 3, a storage device 32 for storing various pieces of information, a communication device 33 for communicating with an external device existing outside the receipt printer 3, and an image forming device 34 that prints the receipt R.

The storage device 32 includes, for example, a volatile memory such as a RAM that functions as a work area for the control device 31, and a nonvolatile memory such as an EEPROM that stores various pieces of information such as a control program PG3 for the receipt printer 3.

The control device 31 includes, for example, a processor. The processor provided in the control device 31 includes, for example, one or more CPUs. The processor provided in the control device 31 executes the control program PG3 stored in the storage device 32 and operates according to the control program PG3, thereby controlling each component of the receipt printer 3. Note that the processor provided in the control device 31 may include hardware such as a GPU, a DSP, or an FPGA in addition to one or more CPUs, or in place of part or all of one or more CPUs.

More specifically, the control device 31 can execute the control program PG3 and operates according to the control program PG3, thereby functioning as a print controller 311, a receipt print information acquisitor 312, and a receipt print information supplier 313.

The receipt print information acquisitor 312 acquires the receipt print information DP supplied from the POS terminal 1 and stores the receipt print information DP in the storage device 32. The print controller 311 performs a printing process. The printing process is a process of controlling the image forming device 34 based on the receipt print information DP acquired by the receipt print information acquisitor 312 to cause the image forming device 34 to print the receipt R. The receipt print information supplier 313 controls the communication device 33 so as to supply the receipt print information DP acquired by the receipt print information acquisitor 312 to the receipt server 4.

The communication device 33 is hardware for communicating with the POS terminal 1 and the receipt server 4 via, for example, a wired network or a wireless network. The image forming device 34 is, for example, hardware that prints the receipt R on recording paper by ejecting ink onto the recording paper. In the present embodiment, it is assumed that the image forming device 34 is a so-called piezo image forming device that drives a piezoelectric element to increase the pressure in the pressure chamber, thereby ejecting ink with which the pressure chamber is filled from a nozzle, but the present disclosure is not limited to such an aspect. For example, the image forming device 34 may be a so-called thermal image forming device that heats a heating element provided in the pressure chamber to generate air bubbles in the pressure chamber to increase the pressure in the pressure chamber, thereby ejecting the ink with which the pressure chamber is filled from the nozzle. Further, in the present embodiment, it is assumed that the image forming device 34 is a so-called ink jet image forming device that ejects ink onto recording paper, but the present disclosure is not limited to such an aspect. The image forming device 34 may be a so-called direct thermal image forming device that has a heating element, and applies heat from the heating element to the recording paper coated with a chemical that develops color when heat is applied, thereby causing the recording paper to develop a color and form an image. Further, the image forming device 34 may be a so-called thermal transfer image forming device that has a heating element, and applies heat to an ink ribbon coated with ink that melts due to heat to transfer the ink applied to the ink ribbon onto the recording paper, thereby forming an image on the recording paper.

Figure 6:
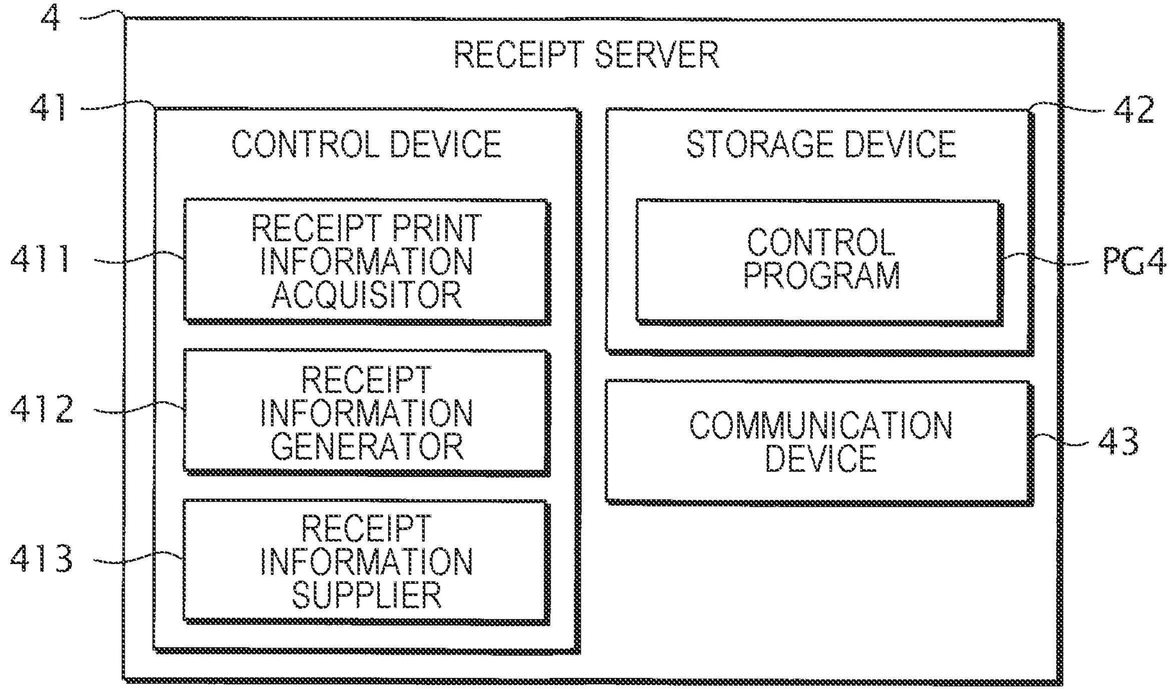
FIG. 6 is a block diagram showing an example of the configuration of a receipt server.

FIG. 6 is a block diagram showing an example of an overview of the configuration of the receipt server 4.

As illustrated in FIG. 6, the receipt server 4 includes a control device 41 for controlling each component of the receipt server 4, a storage device 42 for storing various pieces of information, and a communication device 43 for communicating with an external device existing outside the receipt server 4.

The storage device 42 includes, for example, a volatile memory such as a RAM that functions as a work area for the control device 41, and a nonvolatile memory such as an EEPROM that stores various pieces of information such as a control program PG4 of the receipt server 4.

The control device 41 includes, for example, a processor. The processor provided in the control device 41 includes, for example, one or more CPUs. The processor provided in the control device 41 executes the control program PG4 stored in the storage device 42 and operates according to the control program PG4, thereby controlling each component of the receipt server 4. Note that the processor provided in the control device 41 may include hardware such as a GPU, a DSP, or an FPGA in addition to one or more CPUs, or in place of part or all of one or more CPUs.

More specifically, the control device 41 executes the control program PG4 and operates according to the control program PG4, thereby functioning as a receipt print information acquisitor 411, a receipt information generator 412, and a receipt information supplier 413.

The receipt print information acquisitor 411 acquires the receipt print information DP supplied from the receipt printer 3 and stores the receipt print information DP in the storage device 42. The receipt information generator 412 generates the receipt information DR based on the receipt print information DP acquired by the receipt print information acquisitor 411. Specifically, the receipt information generator 412, for example, may analyze the receipt R indicated by the receipt print information DP to grasp various character strings indicated by the receipt R, and may generate the receipt information DR based on the character strings thus grasped. The receipt information supplier 413 controls the communication device 43 so as to supply the receipt information DR generated by the receipt information generator 412 to the settlement management server 5.

The communication device 43 is hardware for communicating with the receipt printer 3 and the settlement management server 5 via, for example, a wired network or a wireless network.

Figure 7:
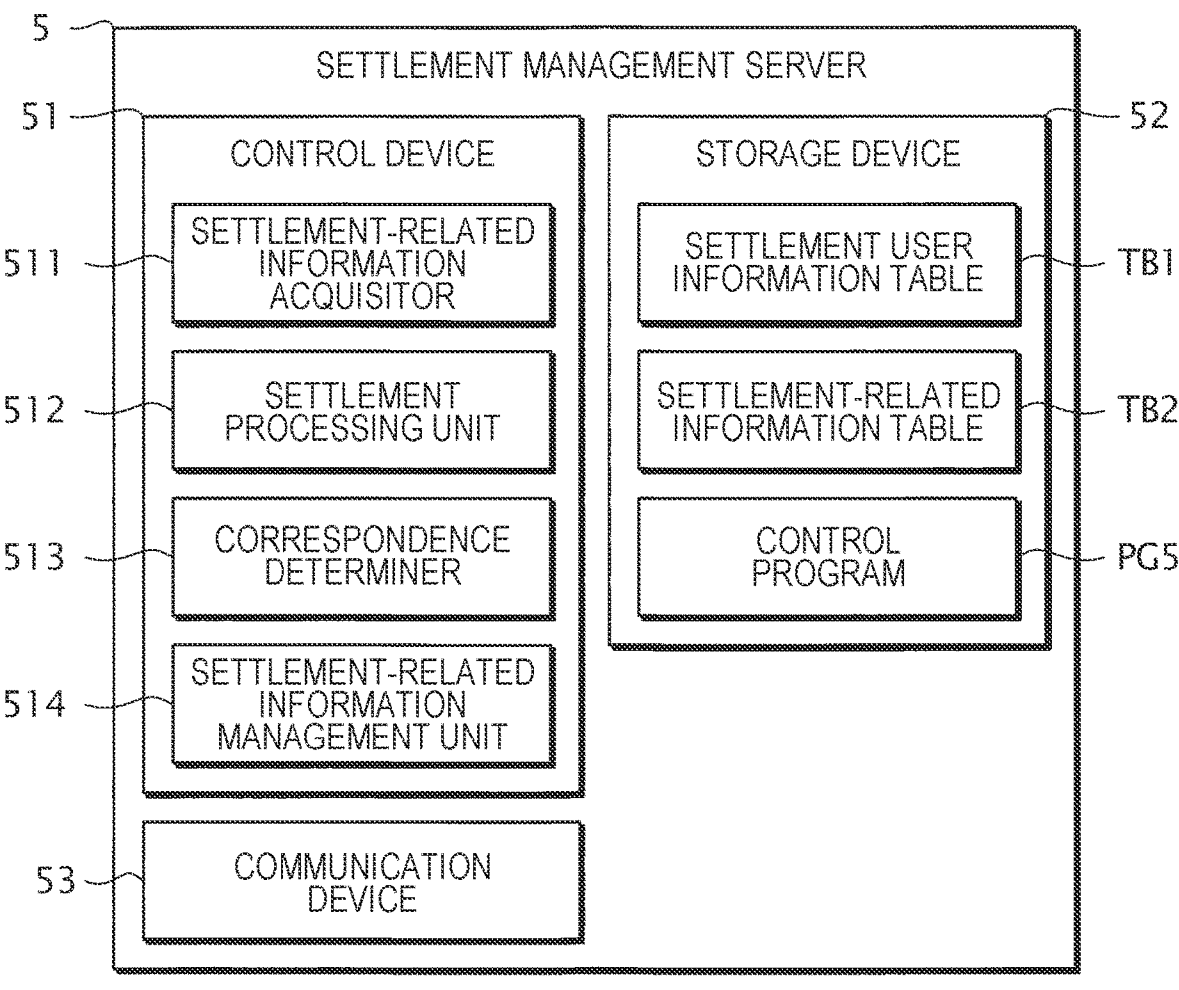
FIG. 7 is a block diagram showing an example of the configuration of a settlement management server.

FIG. 7 is a block diagram showing an example of an overview of the configuration of the settlement management server 5.

As illustrated in FIG. 7, the settlement management server 5 includes a control device 51 for controlling each component of the settlement management server 5, a storage device 52 for storing various pieces of information, and a communication device 53 for communicating with an external device existing outside the settlement management server 5.

The storage device 52 includes, for example, a volatile memory such as a RAM that functions as a work area for the control device 51 and a nonvolatile memory such as an EEPROM that stores various pieces of information. In the present embodiment, the storage device 52 stores a settlement user information table TB1, a settlement-related information table TB2, and a control program PG5 for the settlement management server 5.

The settlement user information table TB1 stores information about the customer U. Specifically, the settlement user information table TB1 stores the credit card number of the credit card owned by the customer U, the expiration date of the credit card owned by the customer U, and the credit limit of the credit card owned by the customer U. The settlement user information table TB1 may store part or all of a name, an age, a sex, an address, an occupation, and an annual income of the customer U. Also, the settlement user information table TB1 may store only information excluding information that can identify the customer U, such as the customer U's name, among information about the customer U.

When it is determined in the correspondence determination process that the settlement feature information DCC included in the settlement approval request information DC and the transaction feature information DRR included in the receipt information DR correspond to each other, the settlement-related information table TB2 stores information related to the user information DU included in the settlement approval request information DC and the transaction detail information DRM included in the receipt information DR in association with each other. The information related to the user information DU is information related to the customer U identified based on the information stored in the settlement user information table TB1 and the user information DU. Information related to the user information DU may be information including, for example, part or all of an age, a sex, an address, an occupation, and an annual income of the customer U. The information related to the user information DU may be information excluding information that can identify the customer U, such as the customer U's name, among information about the customer U.

The control device 51 includes, for example, a processor. The processor provided in the control device 51 includes, for example, one or more CPUs. The processor provided in the control device 51 executes the control program PG5 stored in the storage device 52 and operates according to the control program PG5, thereby controlling each component of the settlement management server 5. Note that the processor provided in the control device 51 may include hardware such as a GPU, a DSP, or an FPGA in addition to one or more CPUs, or in place of part or all of one or more CPUs.

More specifically, the control device 51 can execute the control program PG5 and operates in accordance with the control program PG5, thereby functioning as a settlement-related information acquisitor 511, a settlement processing unit 512, a correspondence determiner 513, and a settlement-related information management unit 514. In addition, in the present embodiment, the settlement-related information acquisitor 511 is an example of an "acquisitor", and the settlement-related information management unit 514 is an example of a "management unit".

The settlement-related information acquisitor 511 acquires the settlement approval request information DC supplied from the settlement terminal 2 and stores the settlement approval request information DC in the storage device 52. Also, the settlement-related information acquisitor 511 acquires the receipt information DR supplied from the receipt server 4 and stores the receipt information DR in the storage device 52.

The settlement processing unit 512 performs a settlement approval process based on the settlement approval request information DC generated by the settlement approval requestor 211. The settlement processing unit 512 also performs a settlement process based on the settlement approval request information DC generated by the settlement approval requestor 211. The settlement process is a process of, for example, instructing a financial institution that operates the account to add the amount corresponding to the product purchased by the customer U at the store to the balance of the account of the corporation that operates the store.

The correspondence determiner 513 performs the correspondence determination process described above. The settlement-related information management unit 514 performs the settlement-related information management process described above. Specifically, in the settlement-related information management process, the settlement-related information management unit 514 stores information related to the user information DU included in the settlement approval request information DC and the transaction detail information DRM included in the receipt information DR in association with each other in the settlement-related information table TB2.

The communication device 53 is hardware for communicating with the settlement terminal 2 and the receipt server 4 via, for example, a wired network or a wireless network.

3. Operation of Settlement System

An example of the operation of the settlement system Sys when the customer U purchases a product at a store will be described below with reference to FIG. 8 to FIG. 10. In addition, hereinafter, the process performed by the settlement system Sys when the customer U purchases the product at the store is referred to as a transaction management process.

Figure 8:
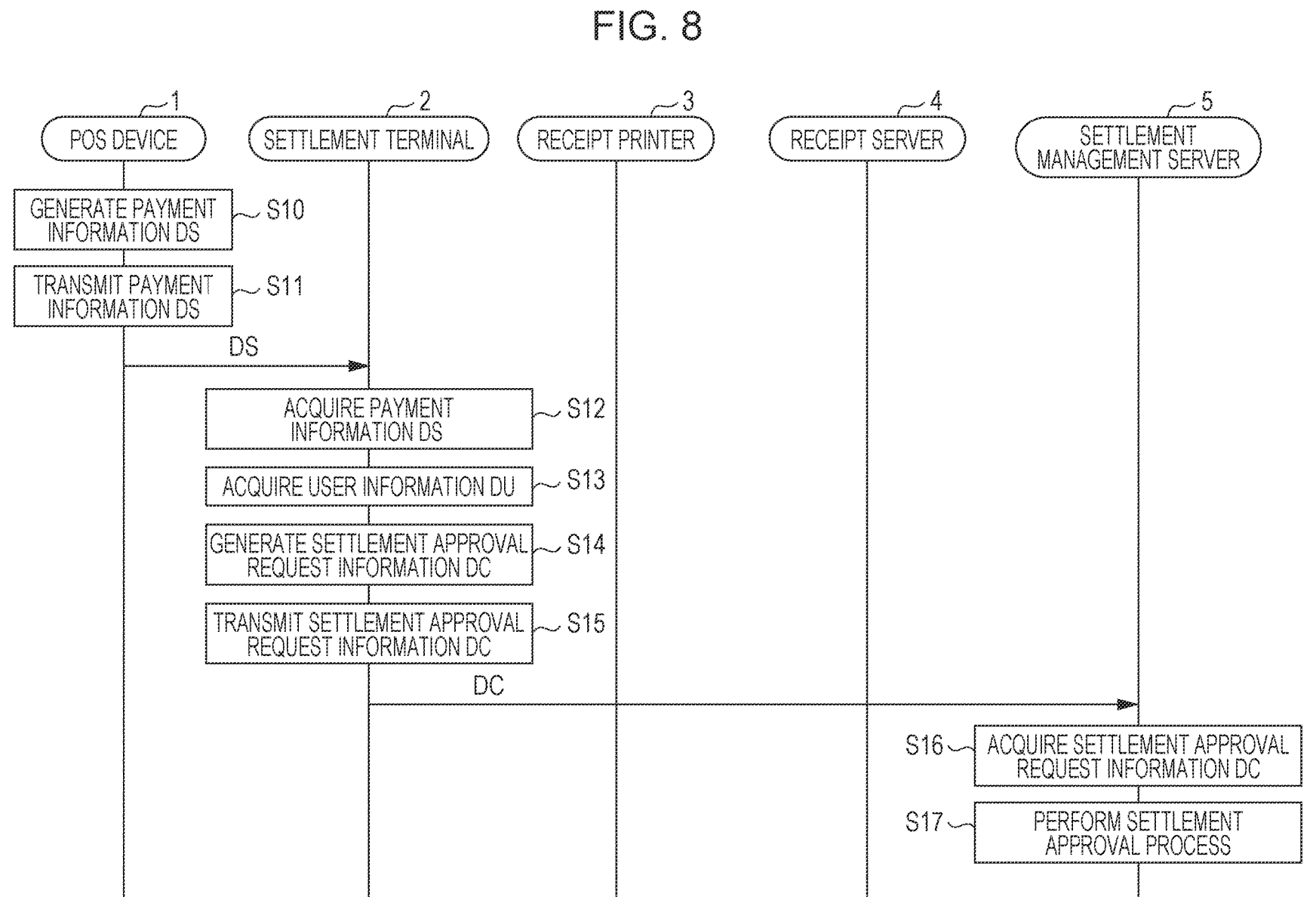

FIGS. 8 to 10 are sequence charts showing an example of the operation of the settlement system Sys when the settlement system Sys performs a transaction management process.

As illustrated in FIG. 8, in the transaction management process, the payment information generator 111 of the POS terminal 1 acquires purchased product information and designated means of settlement information to generate the payment information DS based on the purchased product information and the designated means of settlement information that were acquired (S10). Next, the payment information generator 111 of the POS terminal 1 controls the communication device 13 so that the payment information DS generated in step S10 is transmitted to the settlement terminal 2 (S11).

After that, the settlement approval requestor 211 of the settlement terminal 2 acquires the payment information DS supplied from the POS terminal 1 (S12). Also, the settlement approval requestor 211 of the settlement terminal 2 acquires the user information DU from the credit card of the customer U by controlling the card reader 24 (S13). Next, the settlement approval requestor 211 of the settlement terminal 2 generates the settlement approval request information DC based on the payment information DS acquired in step S12 and the user information DU acquired in step S13 (S14). Then, the settlement approval requestor 211 of the settlement terminal 2 controls the communication device 23 so that the settlement approval request information DC generated in step S14 is transmitted to the settlement management server 5 (S15).

Thereafter, the settlement-related information acquisitor 511 of the settlement management server 5 acquires the settlement approval request information DC supplied from the settlement terminal 2 (S16). Next, the settlement processing unit 512 of the settlement management server 5 performs the settlement approval process based on the settlement approval request information DC acquired by the settlement-related information acquisitor 511 in step S16 (S17). Specifically, in the settlement approval process of step S17, the settlement processing unit 512 refers to the settlement user information table TB1 to identify the credit limit corresponding to the user identification information DU1 included in the settlement approval request information DC, and determines whether the identified credit limit is equal to or greater than the amount indicated by the settlement money amount information DCC2 included in the settlement approval request information DC. In addition, in the settlement approval process of step S17, the settlement processing unit 512 determines whether the current date and time is included in the expiration date indicated by the user-related information DU2 included in the settlement approval request information DC. Then, the settlement processing unit 512 approves the settlement by the customer U when both of the two determination results are affirmative. On the other hand, the settlement processing unit 512 rejects the settlement by the customer U when the result of one or both of the two determinations is negative.

Thereafter, as illustrated in FIG. 9, in the transaction management process, the settlement processing unit 512 of the settlement management server 5 performs a settlement process based on the settlement approval request information DC acquired by the settlement-related information acquisitor 511 in step S16 (S20). Next, the settlement processing unit 512 of the settlement management server 5 generates settlement result information DCz (S21). The settlement result information DCz is, for example, information indicating that the settlement by the customer U was approved in the settlement approval process or that the settlement by the customer U was rejected in the settlement approval process. Then, the settlement processing unit 512 of the settlement management server 5 controls the communication device 53 so that the settlement result information DCz generated in step S21 is transmitted to the settlement terminal 2 (S22).

After that, the settlement approval requestor 211 of the settlement terminal 2 acquires the settlement result information DCz supplied from the settlement management server 5, and control the communication device 23 so that the acquired settlement result information DCz is transmitted to the POS terminal 1 (S23).

After that, the receipt print information generator 112 of the POS terminal 1 acquires the settlement result information DCz supplied from the settlement terminal 2 (S24). Next, the receipt print information generator 112 of the POS terminal 1 generates the receipt print information DP based on the purchased product information and the designated means of settlement information acquired by the payment information generator 111 in step S10 (S25). Then, the receipt print information generator 112 of the POS terminal 1 controls the communication device 13 so that the receipt print information DP generated in step S25 is transmitted to the receipt printer 3 (S26).

Thereafter, as illustrated in FIG. 10, in the transaction management process, the receipt print information acquisitor 312 of the receipt printer 3 acquires the receipt print information DP supplied from the POS terminal 1 (S30). Next, the receipt print information supplier 313 of the receipt printer 3 controls the communication device 33 so that the receipt print information DP acquired by the receipt print information acquisitor 312 in step S30 is transmitted to the receipt server 4 (S31). Also, the print controller 311 of the receipt printer 3 performs a printing process based on the receipt print information DP acquired by the receipt print information acquisitor 312 in step S30, and prints the receipt R (S32).

Then, the receipt print information acquisitor 411 of the receipt server 4 acquires the receipt print information DP supplied from the receipt printer 3 (S33). Next, the receipt information generator 412 of the receipt server 4 generates the receipt information DR based on the receipt print information DP acquired by the receipt print information acquisitor 411 in step S33 (S34). Next, the receipt information supplier 413 of the receipt server 4 controls the communication device 43 so that the receipt information DR generated by the receipt information generator 412 in step S34 is transmitted to the settlement management server 5 (S35).

Thereafter, the settlement-related information acquisitor 511 of the settlement management server 5 acquires the receipt information DR supplied from the receipt server 4 (S36). Next, the correspondence determiner 513 of the settlement management server 5 performs the correspondence determination process based on the settlement feature information DCC included in the settlement approval request information DC acquired by the settlement-related information acquisitor 511 in step S16, and the transaction feature information DRR included in the receipt information DR acquired by the settlement-related information acquisitor 511 in step S36 (S37). In step S37, when the correspondence determiner 513 determines that the settlement feature information DCC and the transaction feature information DRR correspond to each other, the settlement-related information management unit 514 of the settlement management server 5 performs a settlement-related information management process and stores the user information DU included in the settlement approval request information DC and the transaction detail information DRM included in the receipt information DR in association with each other in the settlement-related information table TB2 (S38).

The correspondence determination process performed by the correspondence determiner 513 in step S37 will be described below with reference to FIG. 11.

Figure 11:
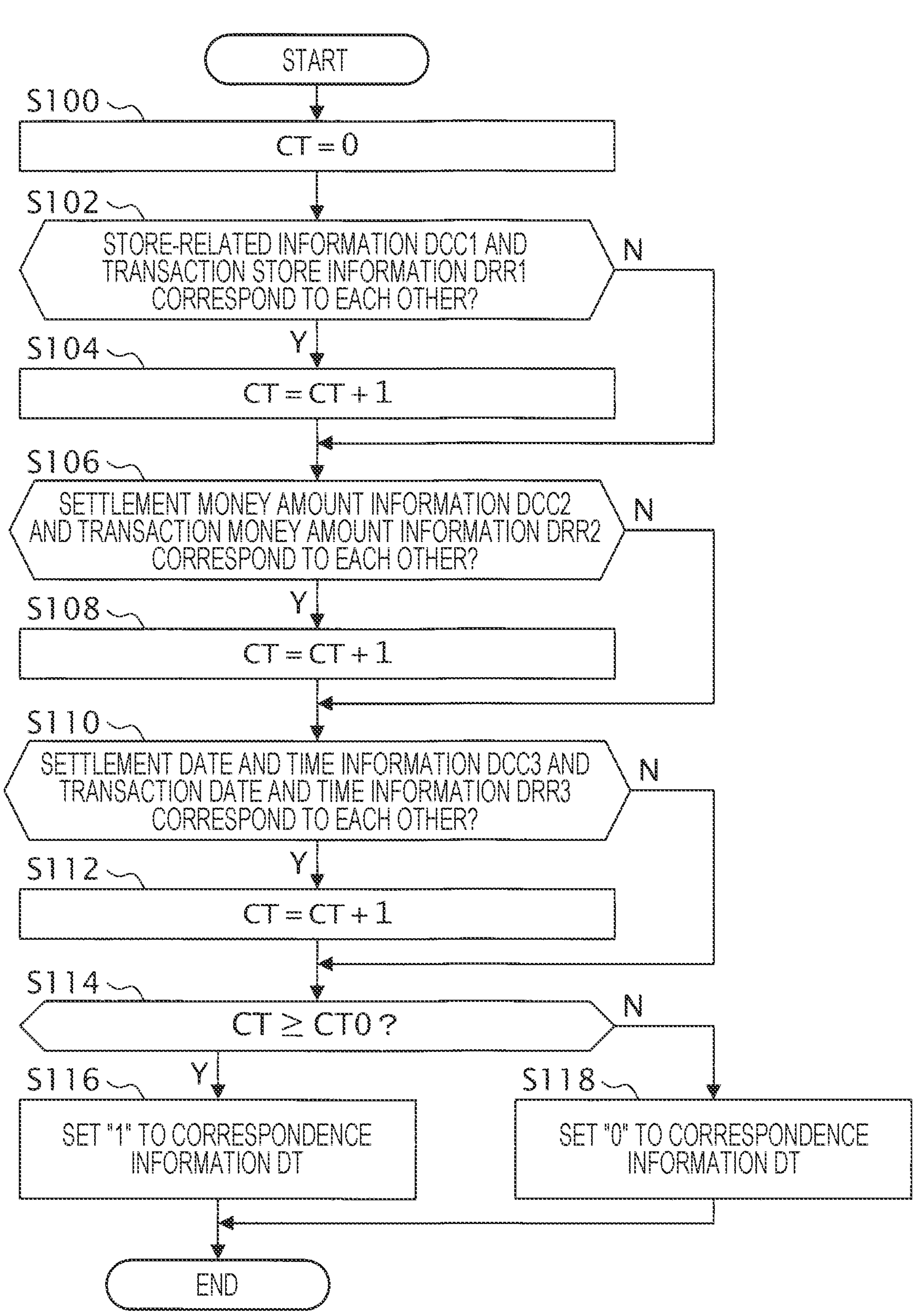
FIG. 11 is a flowchart showing an example of a correspondence determination process.

FIG. 11 is a flowchart showing an example of the operation of the correspondence determiner 513 when the correspondence determiner 513 performs the correspondence determination process.

As illustrated in FIG. 11, when the correspondence determination process is started, the correspondence determiner 513 sets "0" to a count value CT stored in the storage device 52 (S100).

Next, the correspondence determiner 513 determines whether the store-related information DCC1 included in the settlement approval request information DC and the transaction store information DRR1 included in the receipt information DR correspond to each other (S102). Specifically, in step S102, when a store indicated by the store-related information DCC1 and a store indicated by the transaction store information DRR1 match, the correspondence determiner 513 determines that the store-related information DCC1 and the transaction store information DRR1 correspond to each other. Further, in step S102, when a store indicated by the store-related information DCC1 and a store indicated by the transaction store information DRR1 do not match, the correspondence determiner 513 determines that the store-related information DCC1 and the transaction store information DRR1 do not correspond to each other. However, the present disclosure is not limited to such an aspect. For example, in step S102, when the store-related information DCC1 is information related to the store where the customer U purchases the product, the correspondence determiner 513 may determine whether the store indicated by the transaction store information DRR1 is a store belonging to a chain store indicated by the store-related information DCC1 or is a store operated by a corporation indicated by the store-related information DCC1. Then, in step S102, when the store indicated by the transaction store information DRR1 is a store belonging to the chain store indicated by the store-related information DCC1, or is a store operated by the corporation indicated by the store-related information DCC1, the correspondence determiner 513 may determine that the store-related information DCC1 and the transaction store information DRR1 correspond to each other. Further, in step S102, when the store indicated by the transaction store information DRR1 is not a store belonging to the chain store indicated by the store-related information DCC1 or a store operated by the corporation indicated by the store-related information DCC1, the correspondence determiner 513 may determine that the store-related information DCC1 and the transaction store information DRR1 do not correspond to each other. In addition, each of the relationship that the store is a store operated by the provider, the relationship that the store belongs to a chain store operated by the provider, and the relationship that the store is operated by the corporation that is the provider is an example of a "predetermined relationship" between the store and the provider.

Then, when the result of the determination in step S102 is negative, the correspondence determiner 513 advances the process to step S106. On the other hand, when the result of the determination in step S102 is affirmative, the correspondence determiner 513 adds "1" to the count value CT (S104), and advances the process to step S106.

Next, the correspondence determiner 513 determines whether the settlement money amount information DCC2 included in the settlement approval request information DC and the transaction money amount information DRR2 included in the receipt information DR correspond to each other (S106). Specifically, in step S106, when an amount indicated by the settlement money amount information DCC2 and an amount indicated by the transaction money amount information DRR2 match, the correspondence determiner 513 determines that the settlement money amount information DCC2 and the transaction money amount information DRR2 correspond to each other. In step S106, when an amount indicated by the settlement money amount information DCC2 and an amount indicated by the transaction money amount information DRR2 do not match, the correspondence determiner 513 determines that the settlement money amount information DCC2 and the transaction money amount information DRR2 do not correspond to each other. However, the present disclosure is not limited to such an aspect. For example, in step S106, the correspondence determiner 513 may determine whether the settlement money amount information DCC2 and the transaction money amount information DRR2 correspond each other as follows. First, the correspondence determiner 513 identifies the means of settlement identification information DRK1[*r*] indicating the means of settlement related to the settlement approval request information DC from among the R pieces of means of settlement identification information DRK1[1] to DRK1[R] (S1061). The means of settlement related to the settlement approval request information DC is an example of a "predetermined means of settlement". In the present embodiment, the means of settlement related to the settlement approval request information DC is a credit card. Next, in step S1061, the correspondence determiner 513 determines whether an amount indicated by the means of settlement money amount information DRK2[*r*] corresponding to the means of settlement indicated by the identified means of settlement identification information DRK1[*r*] and an amount indicated by the settlement money amount information DCC2 matches (S1062). Then, when the result of determination in step S1062 is affirmative, the correspondence determiner 513 determines that the settlement money amount information DCC2 and the transaction money amount information DRR2 correspond to each other. On the other hand, when the result of determination in step S1062 is negative, the correspondence determiner 513 determines that the settlement money amount information DCC2 and the transaction money amount information DRR2 do not correspond to each other.

Then, when the result of the determination in step S106 is negative, the correspondence determiner 513 advances the process to step S110. On the other hand, when the result of the determination in step S106 is affirmative, the correspondence determiner 513 adds "1" to the count value CT (S108), and advances the process to step S110.

Next, the correspondence determiner 513 determines whether the settlement date and time information DCC3 included in the settlement approval request information DC and the transaction date and time information DRR3 included in the receipt information DR correspond to each other (S110). Specifically, when a first date and time condition and a second date and time condition are satisfied in step S110, the correspondence determiner 513 determines that the settlement date and time information DCC3 included in the settlement approval request information DC and the transaction date and time information DRR3 included in the receipt information DR correspond to each other. The first date and time condition is a condition that the date and time indicated by the transaction date and time information DRR3 is after the date and time indicated by the settlement date and time information DCC3. The second date and time condition is a condition that the length of time from the date and time indicated by the settlement date and time information DCC3 to the date and time indicated by the transaction date and time information DRR3 is within a predetermined time period.

Then, when the result of the determination in step S110 is negative, the correspondence determiner 513 advances the process to step S114. On the other hand, when the result of the determination in step S110 is affirmative, the correspondence determiner 513 adds "1" to the count value CT (S112), and advances the process to step S114.

Next, the correspondence determiner 513 determines whether the count value CT is equal to or greater than a threshold value CT0 (S114). The threshold value CT0 is a real number that satisfies "1≤CT0≤3". In the present embodiment, as an example, it is assumed that the threshold value CT0 is "2".

When the result of determination in step S114 is affirmative, the correspondence determiner 513 sets "1" to correspondence information DT (S116), and ends the correspondence determination process. On the other hand, when the result of determination in step S114 is negative, the correspondence determiner 513 sets "0" to the correspondence information DT (S118), and ends the correspondence determination process.

After that, when the correspondence information DT indicates "1", the settlement-related information management unit 514 performs the settlement-related information management process in the above-described step S38 to store the user information DU included in the settlement approval request information DC and the transaction detail information DRM included in the receipt information DR in association with each other in the settlement-related information table TB2, and then ends the transaction management process. On the other hand, when the correspondence information DT indicates "0", the settlement-related information management unit 514 ends the transaction management process without performing the settlement-related information management process in step S38 described above.

4. Conclusion of Embodiment

In the related art, the settlement management server 5 generally managed only the information supplied from the settlement terminal 2. In this case, the information managed by the settlement management server 5 is limited to the settlement approval request information DC, so that the possibility of utilizing the information for a purpose other than the settlement related to the settlement approval request information DC is limited. Specifically, when the means of settlement related to the settlement approval request information DC is a credit card as in the present embodiment, the information contained in the settlement approval request information DC is the minimum information necessary for approval of the settlement according to the PCIDSS regulations. As a result, it was difficult to utilize the information for a purpose other than the settlement related to the settlement approval request information DC. The PCIDSS is an abbreviation for the Payment Card Industry Data Security Standard.

On the other hand, in the present embodiment, the control program PG5 causes the processor provided in the control device 51 to function as the settlement-related information acquisitor 511 that acquires the receipt information DR based on the receipt print information DP for printing the receipt R representing the transaction details related to the settlement by the receipt printer 3 and acquires the settlement approval request information DC related to a request for approval of the settlement from the settlement terminal 2 requesting approval of the settlement, and when the transaction feature information DRR included in the receipt information DR and the settlement feature information DCC included in the settlement approval request information DC correspond to each other, the settlement-related information management unit 514 that manages the transaction detail information DRM of the receipt information DR and the user information DU of the settlement approval request information DC in association with each other.

For this reason, according to the present embodiment, compared with the mode in the related art in which only the settlement approval request information DC acquired from the settlement terminal 2 is managed as in the related art, it is possible to increase the possibility of utilizing the information for a purpose other than the settlement related to the settlement approval request information DC.

In the present embodiment, the receipt R is an example of a "first image", the receipt print information DP is an example of "print information", the receipt information DR is an example of "first information", the settlement approval request information DC is an example of "second information", the transaction feature information DRR is an example of "first feature information", the settlement feature information DCC is an example of "second feature information", the transaction detail information DRM is an example of a "first settlement information", and the user information DU is an example of "second settlement information".

Further, in the present embodiment, the transaction detail information DRM may be information related to transaction details related to a settlement, and the user information DU may be information related to the transactor who made the settlement.

For this reason, according to the present embodiment, it is possible to grasp the transaction details performed by the transactor of the settlement, and it is possible to utilize the information for a purpose other than the settlement related to the settlement approval request information DC, such as marketing, and the like.

Further, in the present embodiment, the transaction feature information DRR may include the transaction date and time information DRR3 indicating the first timing that is a date and time related to the generation of the receipt print information DP, the settlement feature information DCC may include the settlement date and time information DCC3 indicating the second timing that is a date and time related to a request for approval of the settlement, and the settlement-related information management unit 514 may manage the transaction detail information DRM and the user information DU in association with each other when the first timing is after the second timing and a time period from the second timing from the first timing is within a predetermined time period.

Therefore, according to the present embodiment, even when a plurality of transactors make settlements, it is possible to accurately grasp the transaction details corresponding to the transactor of each transaction.

In the present embodiment, the transaction date and time information DRR3 is an example of "first timing information", and the settlement date and time information DCC3 is an example of "second timing information".

Further, in the present embodiment, the transaction feature information DRR may include the transaction store information DRR1 indicating the settlement facility displayed on the receipt R as a facility where the settlement was made, the settlement feature information DCC may include the store-related information DCC1 related to a provider providing a product or a service related to the settlement, and the settlement-related information management unit 514 may manage the transaction detail information DRM and the user information DU in association with each other when a predetermined relationship exists between the settlement facility and the provider.

Therefore, according to the present embodiment, even when a plurality of transactors make settlements, it is possible to accurately grasp the transaction details corresponding to the transactor of each transaction.

In the present embodiment, the transaction store information DRR1 is an example of "facility information", and the store-related information DCC1 is an example of "provider information".

Further, in the present embodiment, the transaction feature information DRR may include the transaction money amount information DRR2 indicating the first amount of money displayed, on the receipt R, as the money amount of the settlement when the settlement is made by the means of settlement related to the settlement approval request information DC, the settlement feature information DCC may include the settlement money amount information DCC2 indicating the second amount of money that is a money amount of the settlement made by the means of settlement related to the settlement approval request information DC, and the settlement-related information management unit 514 may manage the transaction detail information DRM and the user information DU in association with each other when the first amount of money and the second amount of money of money match.

Therefore, according to the present embodiment, even when a plurality of transactors make settlements, it is possible to accurately grasp the transaction details corresponding to the transactor of each transaction.

In the present embodiment, the transaction money amount information DRR2 is an example of "first money amount information", and the settlement money amount information DCC2 is an example of "second money amount information".

Further, in the present embodiment, when the settlement is made by a plurality of means of settlement including the means of settlement related to the settlement approval request information DC, the transaction feature information DRR may include the means of settlement money amount information DRK2[*r*] indicating a first amount of money displayed as a money amount of a settlement made by the means of settlement related to the settlement approval request information DC, where the money amount is displayed on the receipt R, the settlement feature information DCC may include the settlement money amount information DCC2 indicating a second amount of money that is a money amount of a settlement made by the means of settlement related to the settlement approval request information DC, and the settlement-related information management unit 514 may manage the transaction detail information DRM and the user information DU in association with each other when the first amount of money and the second amount of money match.

Therefore, according to the present embodiment, even when a plurality of transactors make settlements, it is possible to accurately grasp the transaction details corresponding to the transactor of each transaction.

Note that, in the present embodiment, the means of settlement money amount information DRK2[*r*] is another example of "first money amount information".

Further, in the present embodiment, the control program PG3 causes the processor of the control device 31 to function as the receipt print information acquisitor 312 that acquires the receipt print information DP for printing the receipt R representing the transaction details related to the settlement, and the receipt print information supplier 313 that supplies receipt print information DP to the management system 6 that manages, when the transaction feature information DRR included in the receipt information DR based on the receipt print information DP and the settlement feature information DCC included in the settlement approval request information DC related to a request for approval of the settlement correspond to each other, the transaction detail information DRM included in the receipt information DR and the user information DU included in the settlement approval request information DC in association with each other.

For this reason, according to the present embodiment, compared with the mode in the related art in which only the settlement approval request information DC acquired from the settlement terminal 2 is managed as in the related art, it is possible to increase the possibility of utilizing the information for a purpose other than the settlement related to the settlement approval request information DC.

B. MODIFICATIONS

Each of the above forms can be variously modified. Specific modification modes are exemplified below. Two or more modes optionally selected from the following exemplifications can be appropriately merged within a range not inconsistent with each other. In the modifications illustrated below, elements having the same actions and functions as those of the embodiments will be denoted by the reference numerals used in the above description, and detailed description thereof will be appropriately omitted.

First Modification

In the above-described embodiment, the case where the means of settlement related to the settlement approval request information DC is a credit card has been exemplified and explained, but the present disclosure is not limited to such an aspect. The means of settlement other than a credit card may be used as the means of settlement related to the settlement approval request information DC.

Figure 12:
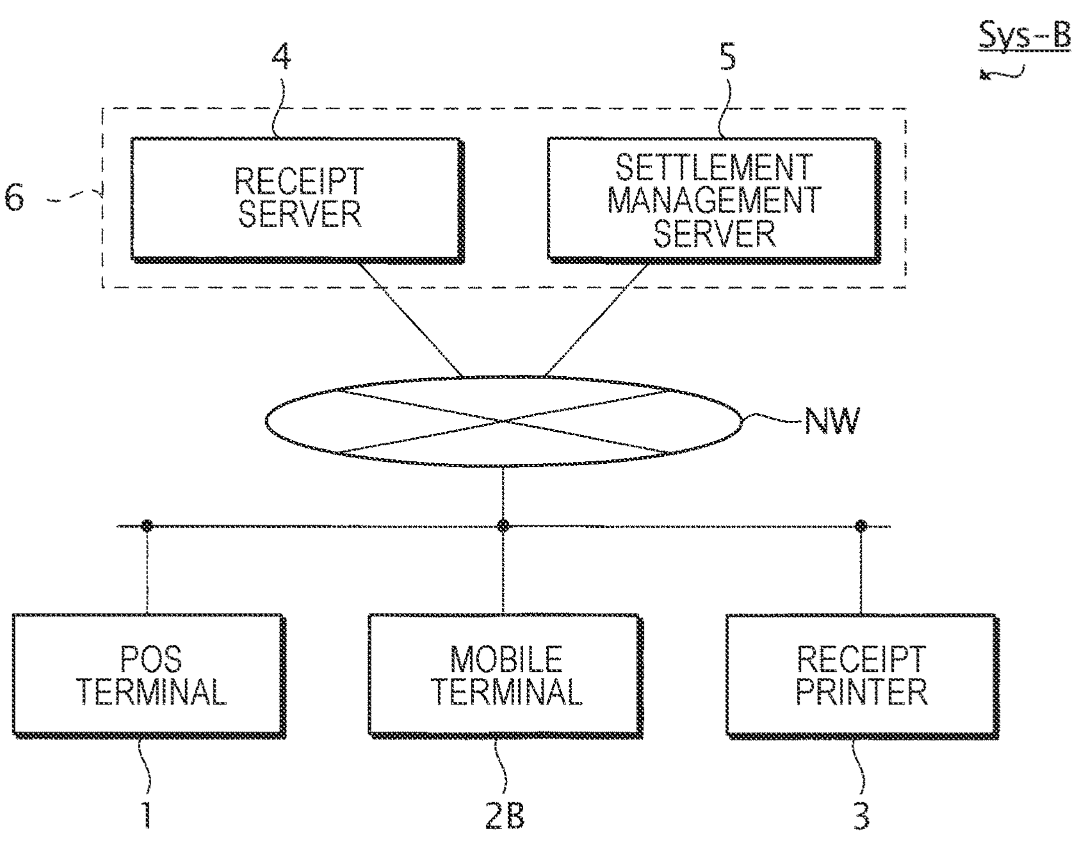
FIG. 12 is a block diagram showing an example of the configuration of a settlement system Sys-B according to the first modification.
Figure 13:
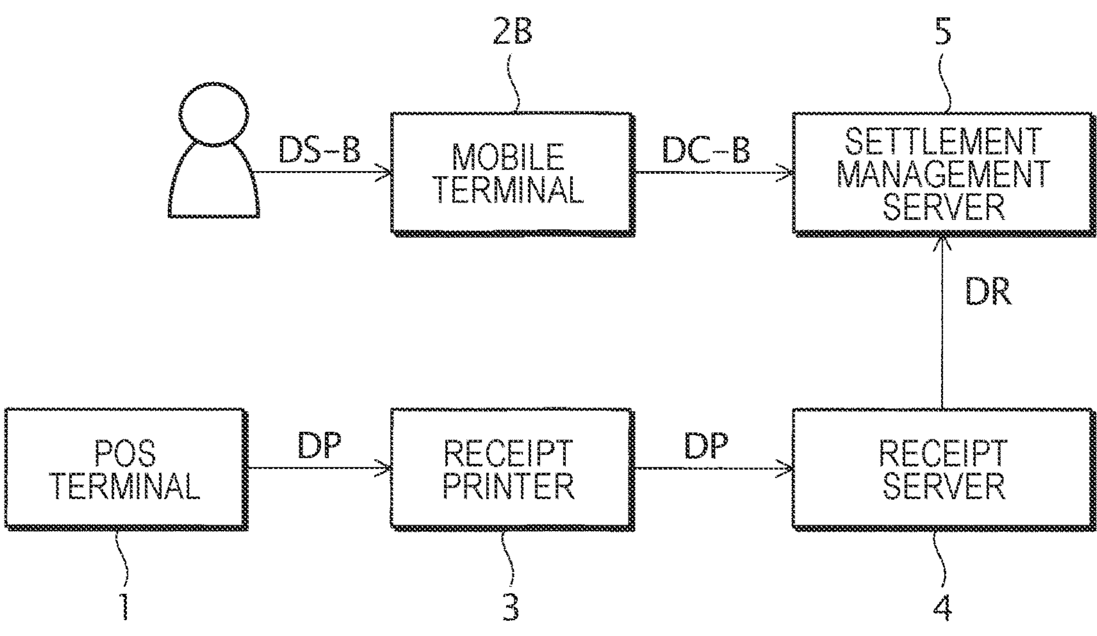
FIG. 13 is an explanatory diagram showing an example of information flow in the settlement system Sys-B according to the first modification.

FIG. 12 is a block diagram showing an example of the configuration of a settlement system Sys-B according to this modification. FIG. 13 is a diagram showing an example of information transmitted and received inside the settlement system Sys-B.

As illustrated in FIG. 12, the settlement system Sys-B differs from the settlement system Sys according to the embodiment in that it includes a mobile terminal 2B instead of the settlement terminal 2. The mobile terminal 2B is, for example, a smart phone or a mobile phone owned by the customer U, and includes an imaging device such as a camera, a display device such as a display, and an input device for the customer U to input information. The mobile terminal 2B requests that the settlement management server 5 approve a settlement using a specific means of settlement.

As illustrated in FIG. 13, the mobile terminal 2B acquires payment information DS-B. In this modification, as an example, it is assumed that the payment information DS-B includes transaction store information DS-B1 and transaction money amount information DS-B2.

The transaction store information DS-B1 is information indicating a store where the customer U purchases the product. In the present embodiment, it is assumed that a two-dimensional barcode indicating the store where the customer U purchases the product is provided at the store. The mobile terminal 2B acquires the transaction store information DS-B1 by capturing an image of the two-dimensional bar code provided at the store with an imaging device provided in the mobile terminal 2B. The transaction money amount information DS-B2 is information indicating the total amount paid by the customer U when purchasing the product. In the present embodiment, it is assumed that the customer U uses the input device provided in the mobile terminal 2B to input the total amount of payment to the mobile terminal 2B. The mobile terminal 2B acquires information indicating the amount of money input from the input device provided in the mobile terminal 2B as the transaction money amount information DS-B2.

In this modification, the mobile terminal 2B generates settlement approval request information DC-B that is information requesting approval of a settlement for the purchase of the product by the customer U and using a specific means of settlement based on the payment information DS-B. In the present embodiment, as an example, it is assumed that the settlement approval request information DC-B includes settlement feature information DC-B1, settlement feature information DC-B2, and user information DU-B.

The settlement feature information DC-B1 is information including store-related information DCC-B1. The store-related information DCC-B1 is information indicating the store where the customer U purchases the product. However, the store-related information DCC-B1 may be information related to the store where the customer U purchases the product.

The settlement feature information DC-B2 is information including settlement money amount information DCC-B2 and settlement date and time information DCC-B3. The settlement money amount information DCC-B2 is information indicating the total amount paid by a specific means of settlement when the customer U purchases a product. The settlement date and time information DCC-B3 is information indicating the date and time when the settlement approval request information DCC-B is generated. In this modification, the date and time when the settlement approval request information DC-B is generated is an example of a "date and time related to a request for approval of a settlement".

The user information DU-B is information including user identification information DU-B1. The user identification information DU-B1 is information for identifying the customer U in a specific means of settlement.

As illustrated in FIG. 12, the mobile terminal 2B can communicate with the settlement management server 5 via a wired network or a wireless network such as the Internet NW. As illustrated in FIG. 13, the mobile terminal 2B transmits the settlement approval request information DC-B generated by the mobile terminal 2B to the settlement management server 5.

FIGS. 14 to 17 are sequence charts showing an example of the operation of the settlement system Sys-B when the settlement system Sys-B performs the transaction management process.

As illustrated in FIG. 14, in the transaction management process, the mobile terminal 2B uses an imaging device to capture an image of the two-dimensional barcode provided at the store, and acquires the transaction store information DS-B1 (S50). Next, the mobile terminal 2B generates the store-related information DCC-B1 based on the transaction store information DS-B1 acquired in step S50 (S51). Next, the mobile terminal 2B transmits the settlement feature information DC-B1 including the store-related information DCC-B1 generated in step S51 to the settlement management server 5 (S52).

Thereafter, the settlement-related information acquisitor 511 of the settlement management server 5 acquires the settlement feature information DC-B1 supplied from the mobile terminal 2B (S53). Next, the control device 51 of the settlement management server 5 generates input screen information DG1 that is information causes the display device of the mobile terminal 2B to display a settlement input screen G1 for inputting the total amount paid by the customer U to purchase the product (S54). Next, the settlement-related information acquisitor 511 of the settlement management server 5 controls the communication device 53 so that the input screen information DG1 generated in step S54 is transmitted to the mobile terminal 2B (S55).

After that, the mobile terminal 2B acquires the input screen information DG1 supplied from the settlement management server 5 (S56). Next, the mobile terminal 2B displays the settlement input screen G1 on the display device based on the input screen information DG1 acquired in step S56 (S57). Then, the mobile terminal 2B acquires the money amount, as the transaction money amount information DS-B2, input by the customer U in the input screen information DG1 acquired in step S56 (S58).

As illustrated in FIG. 15, the mobile terminal 2B generates the settlement money amount information DCC-B2 based on the transaction money amount information DS-B2 acquired in step S58 (S60). Also, the mobile terminal 2B generates the settlement date and time information DCC-B3 based on the current time (S61). Also, the mobile terminal 2B generates the user information DU-B based on, for example, the information about the specific means of settlement stored in the mobile terminal 2B (S62). Then, the mobile terminal 2B transmits, to the settlement management server 5, the settlement approval request information DC-B including the store-related information DCC-B1 generated in step S51, the settlement money amount information DCC-B2 generated in step S60, the settlement date and time information DCC-B3 generated in step S61, and the user information DU-B generated in step S62 (S63). In step S63, the mobile terminal 2B may transmit, to the settlement management server 5, the settlement feature information DC-B2 including at least the settlement money amount information DCC-B2 and the settlement date and time information DCC-B3, and the user information DU-B. Information including the store-related information DCC-B1, the settlement money amount information DCC-B2, and the settlement date and time information DCC-B3 is hereinafter referred to as settlement feature information DCC-B.

Thereafter, the settlement-related information acquisitor 511 of the settlement management server 5 acquires the settlement approval request information DC-B supplied from the mobile terminal 2B (S64). Next, the settlement processing unit 512 of the settlement management server 5 performs the above-described settlement approval process based on the settlement approval request information DC-B acquired by the settlement-related information acquisitor 511 in step S64 (S17).

Figure 16:
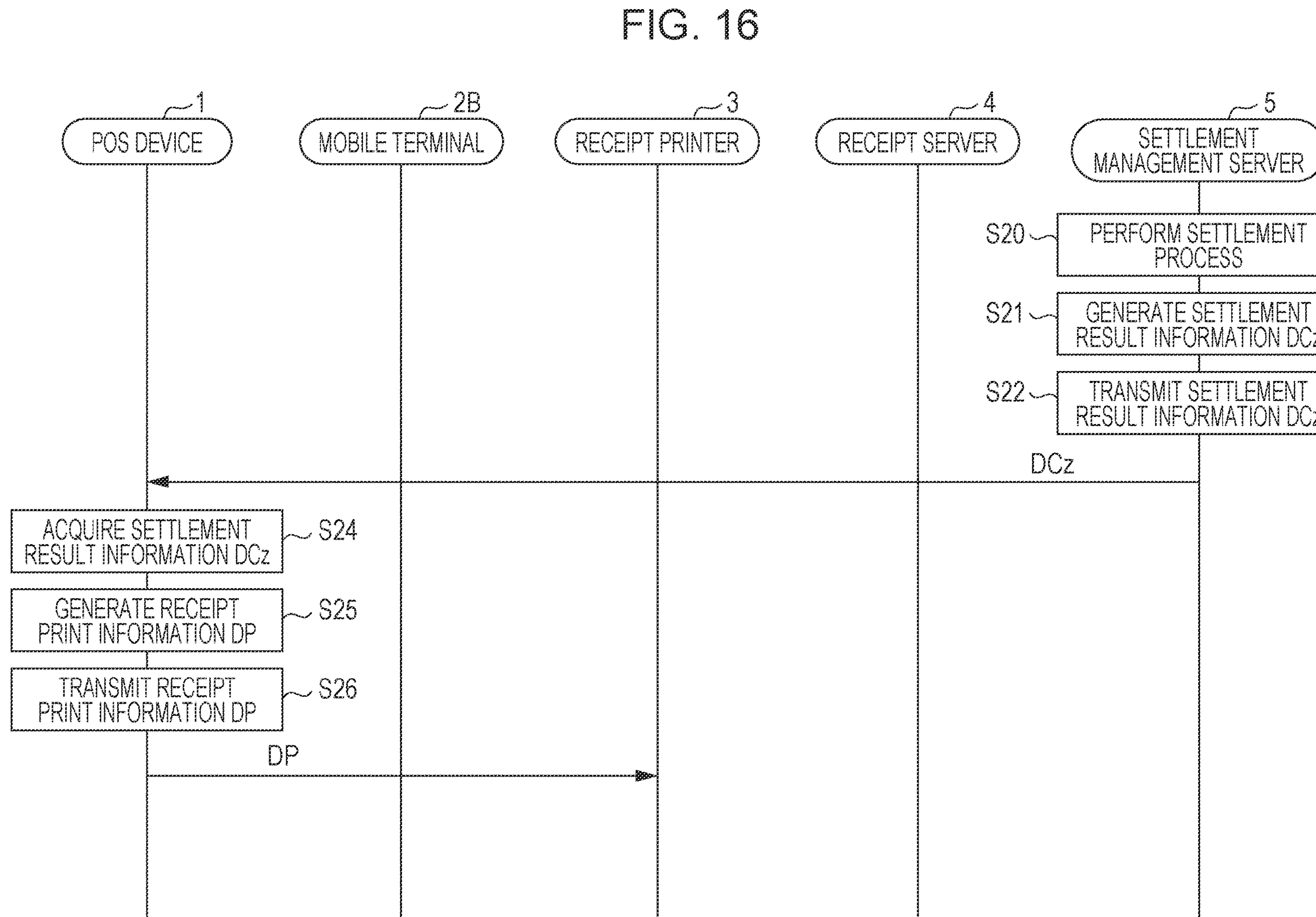
FIG. 16 is a sequence chart showing an example of a transaction management process according to the first modification.

As illustrated in FIG. 16, the settlement processing unit 512 of the settlement management server 5 then performs the process of steps S20, S21, and S22 described above. In this modification, the settlement processing unit 512 of the settlement management server 5 controls the communication device 53 so that the settlement result information DCz is transmitted to the POS terminal 1 in step S22. After that, the control device 11 of the POS terminal 1 performs the process of steps S24 to S26 described above.

Figure 17:
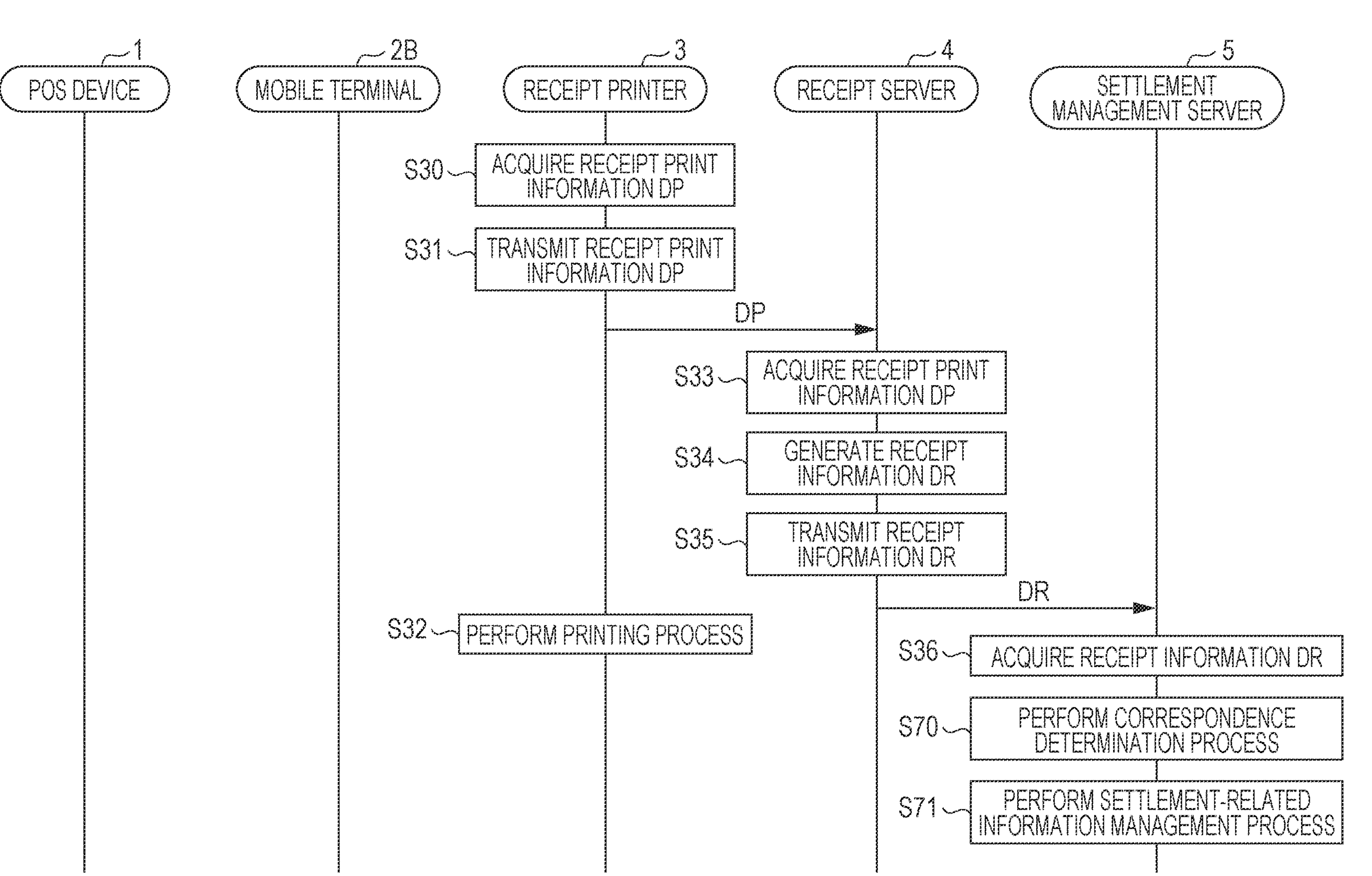
FIG. 17 is a sequence chart showing an example of a transaction management process according to the first modification.

As illustrated in FIG. 17, the settlement system Sys-B then performs the process of steps S30 to S36 described above. Then, the correspondence determiner 513 of the settlement management server 5 performs the correspondence determination process based on the settlement feature information DCC-B included in the settlement approval request information DC-B acquired by the settlement-related information acquisitor 511 in step S64, and the receipt information DR acquired by the settlement-related information acquisitor 511 in step S36 (S70). In this modification, in the correspondence determination process, the correspondence determiner 513 determines whether the store-related information DCC-B1 and the transaction store information DRR1 correspond to each other, determines whether the settlement money amount information DCC-B2 and the transaction money amount information DRR2 correspond to each other, and determines whether the settlement date and time information DCC-B3 and the transaction date and time information DRR3 correspond to each other. Note that the correspondence determination process according to this modification is the same as the correspondence determination process according to the above-described embodiment, except that the settlement feature information DCC-B is used instead of the settlement feature information DCC. Then, in step S70, when the correspondence determiner 513 determines that the settlement feature information DCC-B and the transaction feature information DRR correspond to each other, the settlement-related information management unit 514 of the settlement management server 5 performs a settlement-related information management process to store the user information DU-B included in the settlement approval request information DC-B and the transaction detail information DRM included in the receipt information DR in association with each other in the settlement-related information table TB2 (S71). Note that the settlement-related information management process according to this modification is the same as the settlement-related information management process according to the above-described embodiment, except that the user information DU-B is used instead of the user information DU.

As described above, in this modification, the settlement-related information acquisitor 511 of the settlement management server 5 acquires the settlement approval request information DC-B from the mobile terminal 2B, and acquires the receipt information DR generated by the receipt server 4 based on the receipt print information DP output from the receipt printer 3. In this modification, the settlement-related information management unit 514 of the settlement management server 5 manages the user information DU-B included in the settlement approval request information DC-B and the transaction detail information DRM included in the receipt information DR in association with each other. For this reason, according to this modification, compared with the mode in the related art in which only the user information DU-B included in the settlement approval request information DC-B acquired from the mobile terminal 2B is managed, it is possible to increase the possibility of utilizing the information for a purpose other than the settlement related to the specific means of settlement.

Second Modification

Although the POS terminal 1 supplies the receipt print information DP to the receipt server 4 via the receipt printer 3 in the above-described embodiment and the first modification, the present disclosure is not limited to such an aspect. The POS terminal 1 may supply the receipt print information DP to the receipt server 4.

Figure 18:
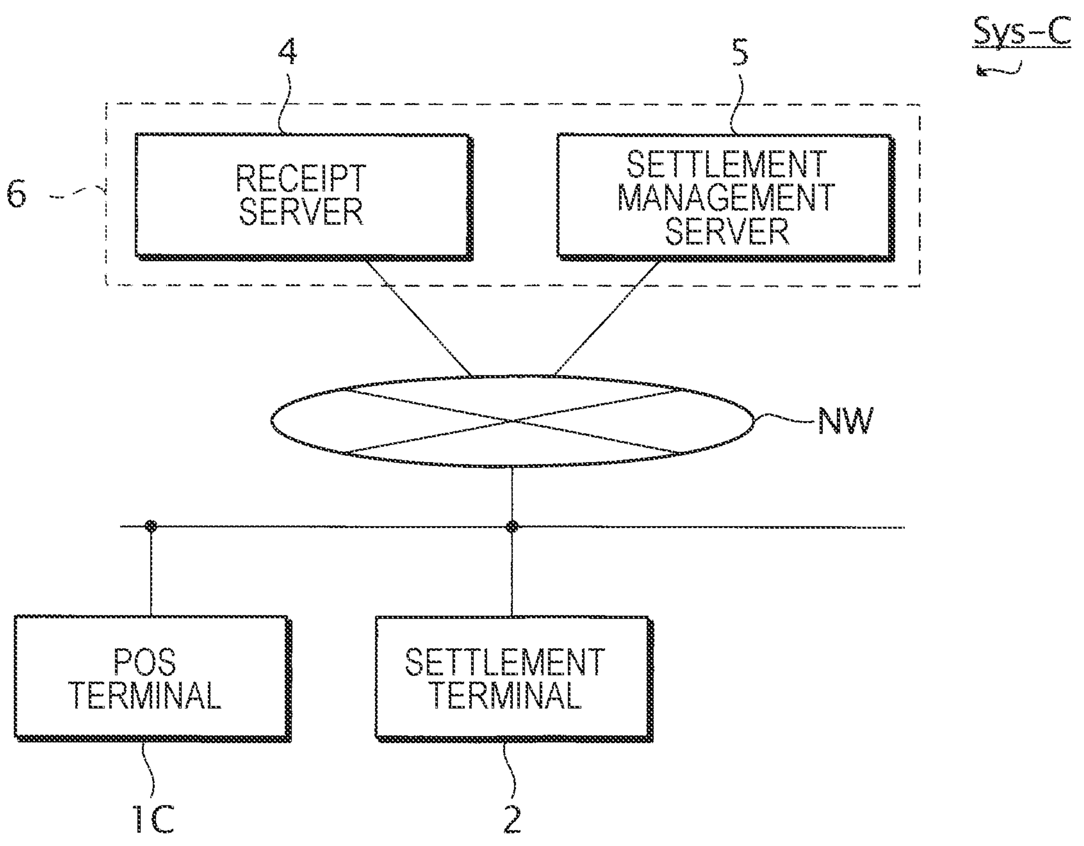
FIG. 18 is a block diagram showing an example of the configuration of a settlement system Sys-C according to the second modification.
Figure 19:
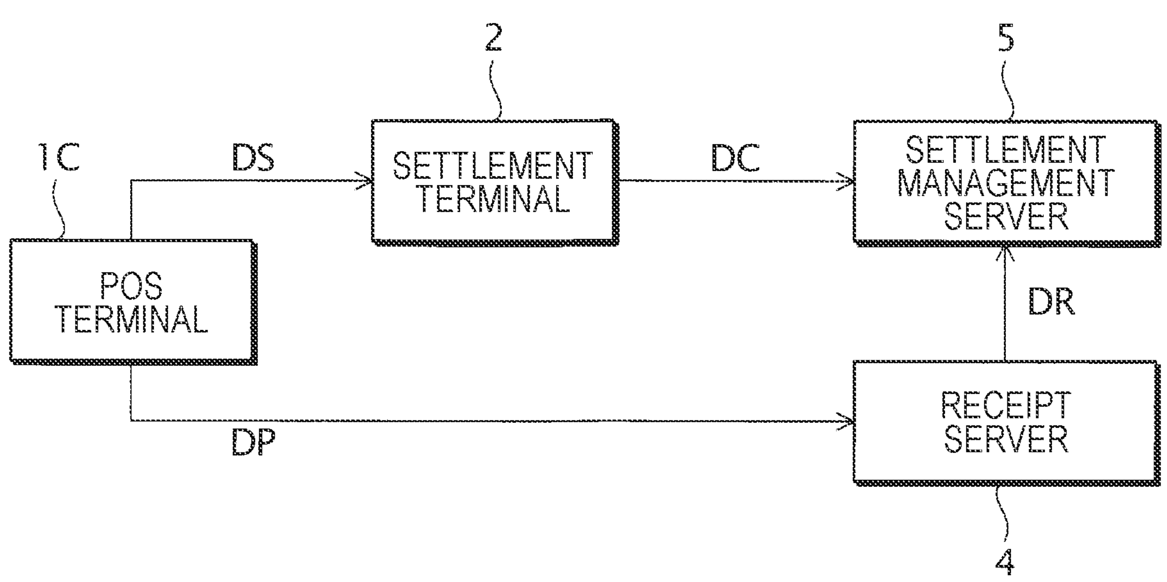
FIG. 19 is an explanatory diagram showing an example of an information flow in the settlement system Sys-C according to the second modification.

FIG. 18 is a block diagram showing an example of the configuration of a settlement system Sys-C according to this modification. FIG. 19 is a diagram showing an example of information transmitted and received inside the settlement system Sys-C.

As illustrated in FIG. 18, the settlement system Sys-C differs from the settlement system Sys according to the embodiment in that it includes a POS terminal 1C instead of the POS terminal 1 and does not include the receipt printer 3.

As illustrated in FIG. 19, the POS terminal 1C differs from the POS terminal 1 that supplies the receipt print information DP to the receipt printer 3 in that it transmits the receipt print information DP to the receipt server 4 via the Internet NW or the like.

As described above, according to this modification, even when the settlement system Sys does not include the receipt printer 3, the settlement management server 5 can manage the user information DU included in the settlement approval request information DC and the transaction detail information DRM included in the receipt information DR in association with each other.

Third Modification

In the above-described embodiment and the first modification, the receipt printer 3 supplies the receipt print information DP to the receipt server 4, and the receipt server 4 transmits the receipt information DR generated based on the receipt print information DP to the settlement management server 5, but the present disclosure is not limited to such an aspect. The receipt printer 3 may supply the receipt information DR generated based on the receipt print information DP to the settlement management server 5.

Figure 20:
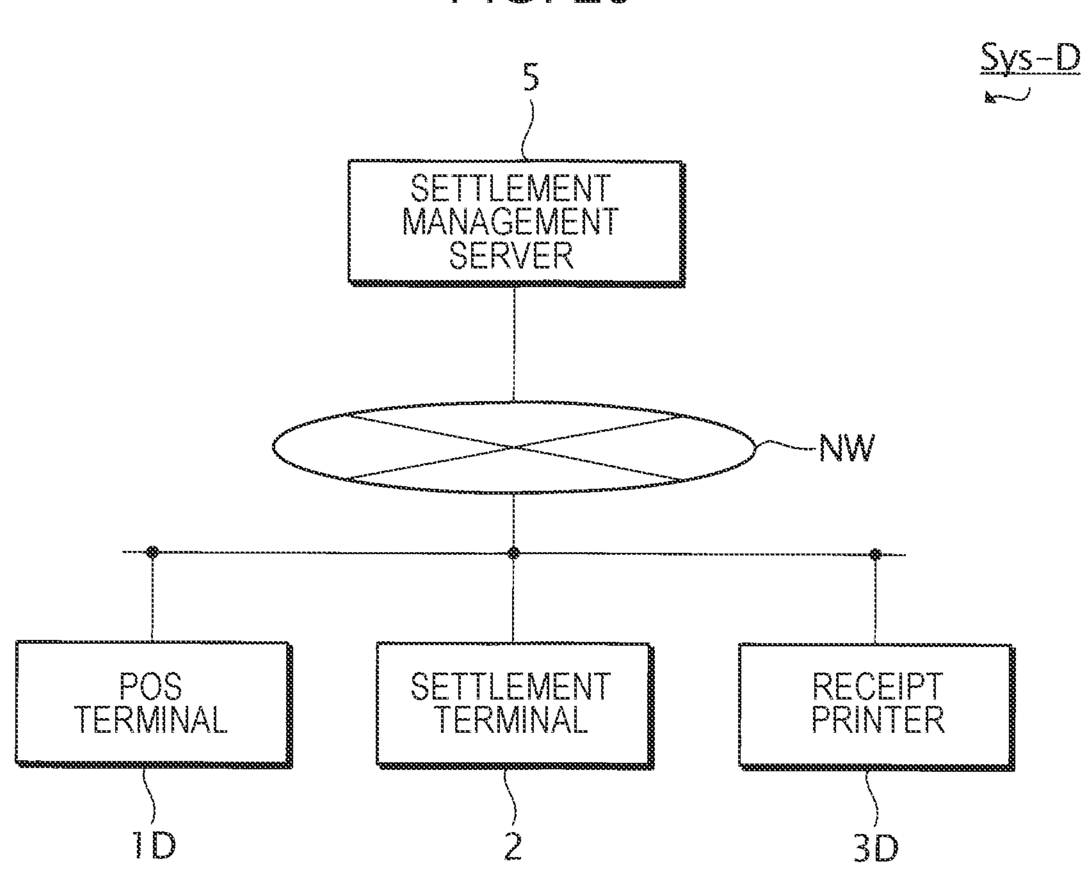
FIG. 20 is a block diagram showing an example of the configuration of a settlement system Sys-D according to the third modification.
Figure 21:
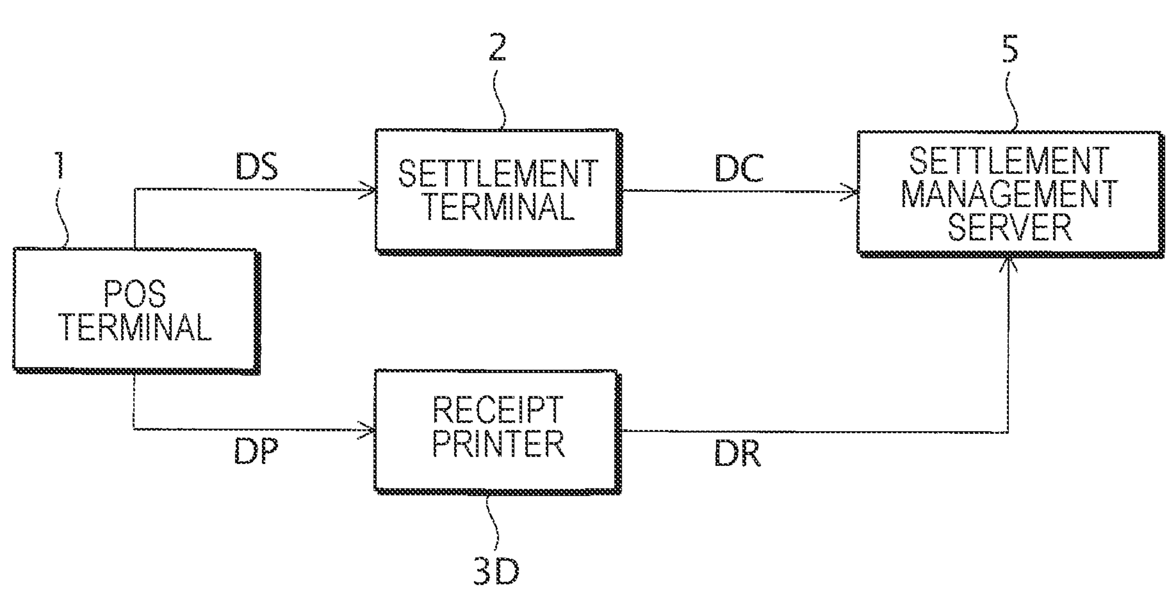
FIG. 21 is an explanatory diagram showing an example of an information flow in the settlement system Sys-D according to the third modification.

FIG. 20 is a block diagram showing an example of the configuration of a settlement system Sys-D according to this modification. FIG. 21 is a diagram showing an example of information transmitted and received inside the settlement system Sys-D.

As illustrated in FIG. 20, the settlement system Sys-D differs from the settlement system Sys according to the embodiment in that it includes a receipt printer 3D instead of the receipt printer 3 and does not include the receipt server 4.

As illustrated in FIG. 21, the receipt printer 3D differs from the receipt printer 3 according to the embodiment that transmits the receipt print information DP to the receipt server 4 in that it generates the receipt information DR based on the receipt print information DP supplied from the POS terminal 1, and transmits the generated receipt information DR to the settlement management server 5. That is, the receipt printer 3D differs from the receipt printer 3 according to the embodiment in that it includes the receipt information generator 412 and includes the receipt information supplier 413 instead of the receipt print information supplier 313.

That is, in this modification, the control program PG3 causes the processor of the control device 31 to function as the receipt print information acquisitor 312 that acquire the receipt print information DP for printing the receipt R representing transaction details related to a settlement, the receipt information generator 412 that generate receipt information DR related to transaction details related to the settlement based on the receipt print information DP acquired by the receipt print information acquisitor 312, and the receipt information supplier 413 that supplies, to the settlement management server 5 that acquires settlement approval request information DC related to a request for approval of the settlement, the receipt information DR generated by the receipt information generator 412, where the settlement management server 5 manages the transaction detail information DRM included in the receipt information DR and the user information DU included in the settlement approval request information DC in association with each other when the transaction feature information DRR included in the receipt information DR and the settlement feature information DCC included in the settlement approval request information DC corresponds to each other.

For this reason, according to this modification, even when the settlement system Sys does not include the receipt server 4, the settlement management server 5 can manage the user information DU included in the settlement approval request information DC and the transaction detail information DRM included in the receipt information DR in association with each other.

In this modification, the receipt print information acquisitor 312 is an example of a "print information acquisitor", the receipt information generator 412 is an example of an "information generator", and the receipt information supplier 413 is an example of an "information supplier".

What is claimed is:

1. A non-transitory computer-readable storage medium storing a program, the program causing a processor to function as:

an acquisitor that, prior to an approval of a settlement of a transaction at a terminal device, acquires first information from a receipt server, which receives print information from a printing apparatus, wherein the first information is based on the print information for printing by the printing apparatus and based on a first image representing transaction details related to the settlement, and acquires second information from a settlement terminal, which receives a request for the approval of the settlement from the terminal device, wherein the second information is related to the request for the approval of the settlement from the terminal device; and a management unit that performs a settlement-related process by storing user information of a user included in the second information based on first settlement information included in the first information and second settlement information included in the second information in association with each other, when first feature information included in the first information and second feature information included in the second information correspond to each other.

2. The non-transitory computer-readable storage medium storing the program according to claim 1, wherein the first settlement information is information about transaction details related to the settlement, and wherein the second settlement information is information about a transactor who made the settlement.

3. The non-transitory computer-readable storage medium storing the program according to claim 2, wherein the first feature information includes first timing information indicating a first timing related to generation of the print information, wherein the second feature information includes second timing information indicating a second timing related to a request for approval of the settlement, and wherein the management unit performs the settlement-related process based on the first settlement information and the second settlement information in association with each other when the first timing is after the second timing, and a time period from the second timing to the first timing is within a predetermined time period.

4. The non-transitory computer-readable storage medium storing the program according to claim 2, wherein the first feature information includes facility information indicating a settlement facility displayed, in the first image, as a facility where the settlement was made, wherein the second feature information includes provider information related to a provider who provides a product or a service related to the settlement, and wherein the management unit performs the settlement-related process based on the first settlement information and the second settlement information in association with each other when a predetermined relationship exists between the settlement facility and the provider.

5. The non-transitory computer-readable storage medium storing the program according to claim 2, wherein the first feature information includes first money amount information indicating a first amount of money displayed, in the first image, as a money amount of the settlement when the settlement is made by a predetermined means of settlement, wherein the second feature information includes second money amount information indicating a second amount of money that is a money amount of the settlement made by the predetermined means of settlement, and wherein the management unit performs the settlement-related process based on the first settlement information and the second settlement information in association with each other when the first amount of money and the second amount of money match.

6. The non-transitory computer-readable storage medium storing the program according to claim 2, wherein when the settlement is made by a plurality of means of settlement including a predetermined means of settlement, the first feature information includes first money amount information indicating a first amount of money that is a money amount of a settlement made by the predetermined means of settlement in the settlement, the money amount being displayed in the first image, wherein the second feature information includes second money amount information indicating a second amount of money that is a money amount of a settlement made by the predetermined means of settlement in the settlement, and wherein the management unit performs the settlement-related process based on the first settlement information and the second settlement information in association with each other when the first amount of money and the second amount of money match.

7. A management method comprising:

prior to an approval of a settlement of a transaction at a terminal device, acquiring, by a processor of a settlement management server, first information from a receipt server, which receives print information from a printing apparatus, wherein the first information is based on the print information for printing by the printing apparatus and based on a first image representing transaction details related to the settlement;

prior to the approval of the settlement, acquiring, by the processor, second information from a settlement terminal, which receives a request for the approval of the settlement from the terminal device, wherein the second information is related to the request for the approval of the settlement from the terminal device; and performing, by the processor, a settlement-related process by storing user information of a user included in the second information based on first settlement information included in the first information and second settlement information included in the second information in association with each other, when first feature information included in the first information and second feature information included in the second information correspond to each other.

8. A settlement system comprising:

one or more processors; and a memory including instructions stored thereon that, when executed by the one or more processors, cause the one or more processors to function as:

an acquisitor that, prior to an approval of a settlement of a transaction at a terminal device, acquires first information from a receipt server, which receives print information from a printing apparatus, wherein the first information is based on the print information for printing by the printing apparatus and based on a first image representing transaction details related to the settlement, and acquires second information from a settlement terminal, which receives a request for the approval of the settlement from the terminal device, wherein the second information is related to the request for the approval of the settlement from the terminal device; and a management unit that performs a settlement-related process by storing user information of a user included in the second information based on first settlement information included in the first information and second settlement information included in the second information in association with each other, when first feature information included in the first information and second feature information included in the second information correspond to each other.

* * * * *